US006349315B1

(12) United States Patent
Sonoyama et al.

(10) Patent No.: US 6,349,315 B1
(45) Date of Patent: *Feb. 19, 2002

(54) DOCUMENT OUTPUT APPARATUS

(75) Inventors: Yuji Sonoyama; Akiyo Tsujimura, both of Ome; Masao Konishi, Iruma; Ryoichi Miyagawa, Kawagoe; Masayo Nakamura, Hachioji; Kazuyasu Haraguchi, Chofu, all of (JP)

(73) Assignee: Casio Computer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/981,443

(22) PCT Filed: May 1, 1997

(86) PCT No.: PCT/JP97/01495

§ 371 Date: Dec. 19, 1997

§ 102(e) Date: Dec. 19, 1997

(87) PCT Pub. No.: WO97/41523

PCT Pub. Date: Nov. 6, 1997

(30) Foreign Application Priority Data

May 1, 1996 (JP) .............................. 8-110903
May 10, 1996 (JP) .............................. 8-116519

(51) Int. Cl.[7] ......................... G06F 15/00; G06F 17/00
(52) U.S. Cl. ..................................... 707/528; 707/504
(58) Field of Search ........................ 707/528, 503, 707/504, 526, 530, 903, 904, 505, 509

(56) References Cited

U.S. PATENT DOCUMENTS 5,194,969 A    3/1993   DiFrancesco
5,231,577 A    7/1993   Anderson et al.
5,247,611 A    9/1993   Norden-Paul et al.
5,339,392 A    8/1994   Risberg et al.
5,463,724 A   10/1995   Anderson et al.
5,471,612 A   11/1995   Schlafly
5,598,519 A *  1/1997   Narayanan ................... 395/765
5,657,460 A *  8/1997   Egan et al. .................. 395/326

(List continued on next page.)

FOREIGN PATENT DOCUMENTS

EP    0 514 101 A2   11/1992
EP    0 535 982 A2    4/1993

OTHER PUBLICATIONS

Microsoft Office 6–in–1. Que Corporation 1994. pp. 310, 311, 321, 322, 336, 337.*
Chi et al, "A Spreadsheet Approach to Information Visualization", IEEE 1997, pp. 17–24.*

(List continued on next page.)

Primary Examiner—Thomas Black
Assistant Examiner—Uyen Le
(74) Attorney, Agent, or Firm—Frishauf, Holtz, Goodman, Langer & Chick, P.C.

(57) ABSTRACT

A document output apparatus outputs a document made up of plural cells in such a manner that either the characters entered in cells or the backgrounds of the cells are colored in accordance with the kinds of data assigned to the cells. The document output apparatus has plural color tables, and each of these color tables stores plural color information corresponding to respective values of the data. When one of the color tables is designated, color information corresponding to the values of the cells are retrieved from the designated color table. The cells are drawn in the colors defined in the designated color table. Accordingly, it is possible to eliminate the need to define color information for each of the cells of the document.

2 Claims, 22 Drawing Sheets

U.S. PATENT DOCUMENTS

| | | | |
|---|---|---|---|
| 5,768,158 A | * 6/1998 | Adler et al. | 395/500.12 |
| 5,844,572 A | * 12/1998 | Schott | 345/440 |
| 5,893,130 A | * 4/1999 | Inoue et al. | 707/528 |
| 5,918,238 A | * 6/1999 | Hayashi | 707/526 |
| 5,943,059 A | * 8/1999 | Satoh et al. | 345/431 |
| 5,999,193 A | * 12/1999 | Conley, Jr. et al. | 345/440 |

OTHER PUBLICATIONS

C. Plaisant, B. Milash, A. Rose, S. Widoff, B. Schneidermann: Lifelines: Visualing Personal Histories, Conference Proceedings on Human Factors in Computing Science, Vancouver, Canada, Apr. 13–16, 1996.

W.–A. Jungmeister, D. Turo: Adapting Treemaps to Stock Portfolio Visualisation, University of Maryland, Center for Automation Research, Technical Report CAR–TR–648, CS–TR–2996, November 1992.

B. Corrie, P. Mackerras: Data Shaders, Proceedings Visualization 93, pp. 275–282, IEEE Computer Society Press, October 1993.

P. Lucas, S. Roth, C. Gomberg: Visage: Dynamic Information Exploration, Proceedings CHI 96, Apr. 13–18, 1996.

D. Keim, H.–P. Kriegel: VisDB: Database Exploration Using Multidimensional Visualization, IEEE Computer Graphics and Applications, September 1994, pp. 40–49.

* cited by examiner

FIG.3

| COLOR DICTIONARY DESIGNATION | OBJECTIVE REFERENCE FOR CURRENT FISCAL YEAR |
|---|---|

| CELL | COLOR | ITEM COLOR NAME | OBJECT ITEM | . . . |
|---|---|---|---|---|
| C3 | RED | SALES EVALUATION COLOR | C3 | |
| C4 | BLUE | SALES EVALUATION COLOR | C4 | |
| C5 | YELLOW | SALES EVALUATION COLOR | C5 | |
| . . | . . | . . | . . | |
| C9 | GREEN | MONTHLY TOTAL EVALUATION COLOR | C9 | |
| D9 | RED | MONTHLY TOTAL EVALUATION COLOR | D9 | |
| . . | . . | . . | . . | |
| I3 | BLUE | SEMIANNUAL TOTAL EVALUATION COLOR | I3 | |
| I4 | GREEN | SEMIANNUAL TOTAL EVALUATION COLOR | I4 | |
| . . | . . | | | |

FIG.4A

| DICTIONARY NAME | AVERAGE REFERENCE OF LAST FISCAL YEAR | | | |
|---|---|---|---|---|
| ITEM COLOR NAME | EVALUATION CONDITION | COLOR | | |
| | | R | G | B |
| MONTHLY TOTAL EVALUATION COLOR | > 18,000 | 255 | 0 | 0 |
| | > 13,000 | 200 | 0 | 0 |
| | > 11,000 | 100 | 0 | 0 |
| | > 3,000 | 50 | 0 | 0 |
| SALES EVALUATION COLOR | > 2,500 | 0 | 0 | 255 |
| | > 1,500 | 0 | 0 | 120 |
| | > 500 | 0 | 0 | 60 |
| SEMIANNUAL TOTAL EVALUATION COLOR | > 12,000 | 0 | 255 | 0 |

FIG.4B

| DICTIONARY NAME | OBJECTIVE REFERENCE FOR CURRENT FISCAL YEAR | | | |
|---|---|---|---|---|
| ITEM COLOR NAME | EVALUATION CONDITION | COLOR | | |
| | | R | G | B |
| MONTHLY TOTAL EVALUATION COLOR | > 20,000 | 255 | 0 | 0 |
| | > 15,000 | 200 | 0 | 0 |
| | > 10,000 | 100 | 0 | 0 |
| | > 5,000 | 50 | 0 | 0 |
| SALES EVALUATION COLOR | > 3,000 | 0 | 0 | 255 |
| | > 2,000 | 0 | 0 | 120 |
| | > 1,000 | 0 | 0 | 60 |
| SEMIANNUAL TOTAL EVALUATION COLOR | > 15,000 | 0 | 255 | 0 |

FIG.5A

| DICTIONARY NAME | MONTHLY SALES EVALUATION | | | |
|---|---|---|---|---|
| ITEM COLOR NAME | EVALUATION CONDITION | COLOR | | |
| | | R | G | B |
| MONTHLY EVALUATION COLOR | > 20,000 | 255 | 0 | 0 |
| | > 15,000 | 200 | 0 | 0 |
| | > 10,000 | 100 | 0 | 0 |
| | > 5,000 | 50 | 0 | 0 |

FIG.5B

| DICTIONARY NAME | SALES EVALUATION FOR EACH SALES ITEM | | | |
|---|---|---|---|---|
| ITEM COLOR NAME | EVALUATION CONDITION | COLOR | | |
| | | R | G | B |
| SALES EVALUATION COLOR | > 3,000 | 0 | 0 | 255 |
| | > 2,000 | 0 | 0 | 120 |
| | > 1,000 | 0 | 0 | 60 |

FIG.5C

| DICTIONARY NAME | FOR STORAGE | | | |
|---|---|---|---|---|
| ITEM COLOR NAME | EVALUATION CONDITION | COLOR | | |
| | | R | G | B |
| | | | | |

FIG.6

DOCUMENT DESIGN — COLOR DICTIONARY CHANGE

FILE  EDIT  FORMAT  CELL BACKGOUND COLOR

- RED
- BLUE
- YELLOW
- GREEN

|   | A | B | D | E | | I | J |
|---|---|---|---|---|---|---|---|
| 1 | | | SALES ACHIEVEMENT | | COLOR DICTIONARY | | |
| 2 | | SALES ITEM | MAY | JUNE | | | SEMIANNUAL TOTAL |
| 3 | | | | | | | |
| 4 | | | | | | | |
| 5 | | | | | | | |
| 6 | | | | | | | |
| 7 | | | | | | | |
| 8 | | MONTHLY TOTAL | | | | | |
| 9 | | | | | | | |

COLOR DICTIONARY
- FOR STORAGE
- AVERAGE REFERENCE OF LAST FISCAL YEAR
- OBJECTIVE REFERENCE FOR CURRENT FISCAL YEAR
- MONTHLY SALES EVALUATION
- SALES EVALUATION FOR EACH SALES ITEM
- SEMIANNUAL TOTAL

| CELL ITEM | COLOR |
|---|---|
| | C9 ; H9 |
| MONTHLY TOTAL EVALUATION COLOR | |
| SEMIANNUAL TOTAL EVALUATION COLOR | |
| SALES EVALUATION COLOR | |
| PROFIT RATE COLOR | |
| ITEM COLOR | |

FIG.7B

| CELL ITEM | COLOR |
|---|---|
| | 13 ; 18 |
| MONTHLY TOTAL EVALUATION COLOR | |
| SEMIANNUAL TOTAL EVALUATION COLOR | |
| SALES EVALUATION COLOR | |
| PROFIT RATE COLOR | |
| ITEM COLOR | |

FIG.7C

| CELL ITEM | COLOR |
|---|---|
| | C3 ; C8 |
| MONTHLY TOTAL EVALUATION COLOR | |
| SEMIANNUAL TOTAL EVALUATION COLOR | |
| SALES EVALUATION COLOR | |
| PROFIT RATE COLOR | |
| ITEM COLOR | |

FIG.9

DOCUMENT PREVIEW      COLOR DICTIONARY CHANGE

FILE  NEXT  PREVIOUS  PRINT                    COLOR DICTIONARY
      PAGE  PAGE

| | A | B | C | D | E | | | I | J |
|---|---|---|---|---|---|---|---|---|---|
| 1 | | | | SALES ACHIEVEMENTS | | | | | |
| 2 | | SALES ITEM | APRIL | MAY | JUNE | | | SEMIANNUAL TOTAL | |
| 3 | | AD5000 | 1,565 | 2,454 | 3,343 | | | 14,882 | |
| 4 | | SX8000 | 1,474 | 2,363 | 3,252 | 3,141 | 2,039 | 2,528 | 14,797 |
| 5 | | AX1000 | 1,313 | 2,224 | 3,135 | 3,546 | 2,557 | 2,468 | 15,246 |
| 6 | | JW5500 | 1,254 | 2,143 | 3,032 | 3,521 | 2,409 | 2,398 | 14,756 |
| 7 | | EX1200 | 1,126 | 2,037 | 3,548 | 3,459 | 2,360 | 2,213 | 14,745 |
| 8 | | QV1000 | 1,045 | 2,565 | 3,499 | 3,376 | 2,221 | 2,147 | 14,882 |
| 9 | | MONTHLY TOTAL | 7,779 | 13,786 | 19,810 | 20,301 | 13,753 | 13,879 | 99,999 |

COLOR DICTIONARY:
- FOR STORAGE
- AVERAGE REFERENCE OF LAST FISCAL YEAR
- OBJECTIVE REFERENCE FOR CURRENT FISCAL YEAR
- MONTHLY SALES EVALUATION
- SALES EVALUATION FOR EACH SALES ITEM

FIG.10

| | A | B | C | D | E | | | I | J |
|---|---|---|---|---|---|---|---|---|---|
| | | | | SALES ACHIEVEMENTS | | | | | |
| 1 | | SALES ITEM | APRIL | MAY | JUNE | | | SEMIANNUAL TOTAL | |
| 2 | | AD5000 | 1,565 | 2,454 | 3,343 | 3,141 | 2,528 | 14,882 | |
| 3 | | SX8000 | 1,474 | 2,363 | 3,252 | 3,546 | 2,468 | 14,797 | |
| 4 | | AX1000 | 1,313 | 2,224 | 3,135 | 3,521 | 2,398 | 15,246 | |
| 5 | | JW5500 | 1,254 | 2,143 | 3,032 | 3,459 | 2,213 | 14,756 | |
| 6 | | EX1200 | 1,126 | 2,037 | 3,548 | 3,376 | 2,147 | 14,745 | |
| 7 | | QV1000 | 1,045 | 2,565 | 3,499 | 2,221 | | 14,882 | |
| 8 | | MONTHLY TOTAL | 7,779 | 13,786 | 19,810 | 20,301 | 13,753 | 13,879 | 99,999 |

FILE  NEXT PAGE  PREVIOUS PAGE  PRINT  DOCUMENT PREVIEW  COLOR DICTIONARY CHANGE

COLOR DICTIONARY

FOR STORAGE
AVERAGE REFERENCE OF LAST FISCAL YEAR
OBJECTIVE REFERENCE FOR CURRENT FISCAL YEAR
MONTHLY SALES EVALUATION
SALES EVALUATION FOR EACH SALES ITEM

FIG.14A

COLOR CONTROL FILE

| | REFERENCE VALUE | COLOR |
|---|---|---|
| a | NUMBER OF ITEMS IN STOCK > NUMBER OF ITEMS ORDERED | GREEN |
| b | 0 ≤ NUMBER OF ITEMS IN STOCK ≤ NUMBER OF ITEMS ORDERED | YELLOW |
| c | NUMBER OF ITEMS IN STOCK = 0 | RED |

FIG.14B

SALES ITEM MASTER

| SALES ITEM CODE | SALES ITEM NAME | NUMBER OF ITEMS IN STOCK | NUMBER OF ITEMS ORIDERED |
|---|---|---|---|
| 0001 | A A A A A | 20 | 10 |
| 0002 | B B B B B | 5 | 15 |
| 0003 | C C C C C | 0 | 10 |

FIG.14C

DISPLAY SCREEN

SLIP NO. ×××

| SALES ITEM | NUMBER OF ITEMS | UNIT PRICE | TOTAL |
|---|---|---|---|

| | SALES ITEM LIST | |
|---|---|---|
| (a) | 0001 A A A A A | ← GREEN |
| (b) | 0002 B B B B B | ← YELLOW |
| (c) | 0003 C C C C C | ← RED |

FIG.15

| REFERENCE VALUE | COLOR |
|---|---|
| NUMBER OF ITEMS ENTERED < NUMBER OF ITEMS IN STOCK | GREEN |
| NUMBER OF ITEMS ENTERED = NUMBER OF ITEMS IN STOCK | YELLOW |
| NUMBER OF ITEMS ENTERED > NUMBER OF ITEMS IN STOCK | RED |

FIG.16

SLIP NO. ×××

| SALES ITEM | NUMBER OF ITEMS | UNIT PRICE | TOTAL |
|---|---|---|---|
| A A A A A | 8 | | |

└ GREEN   ENTER "8"

| | CODE | SALES ITEM NAME | UNIT PRICE | NUMBER OF ITEMS IN STOCK | 100% 50 0 | |
|---|---|---|---|---|---|---|
| | ⋮ | ⋮ | | | | |
| (a) | 0005 | A A A A A | | 60 | DEPICT GREEN | |
| (b) | 0006 | B B B B B | | 80 | BLUE | |
| (c) | 0007 | C C C C C | | 10 | | ← RED |
| (d) | 0008 | D D D D D | | 20 | | |
| | ⋮ | ⋮ | | | | YELLOW |

FIG.19A

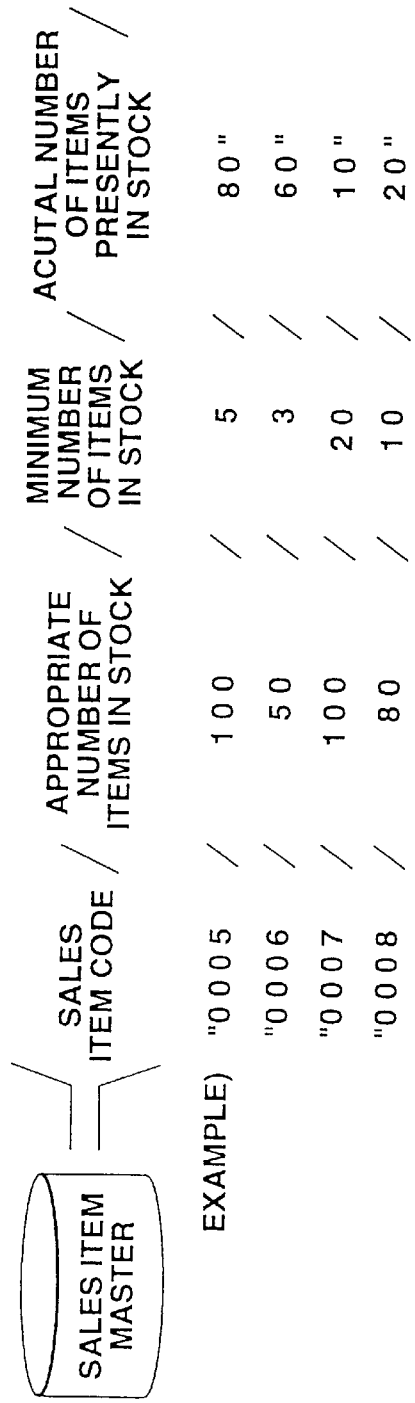

SALES ITEM MASTER

EXAMPLE)

| SALES ITEM CODE | APPROPRIATE NUMBER OF ITEMS IN STOCK | MINIMUM NUMBER OF ITEMS IN STOCK | ACUTAL NUMBER OF ITEMS PRESENTLY IN STOCK |
|---|---|---|---|
| "0005" | 100 | 5 | 80" |
| "0006" | 50 | 3 | 60" |
| "0007" | 100 | 20 | 10" |
| "0008" | 80 | 10 | 20" |

FIG.19B

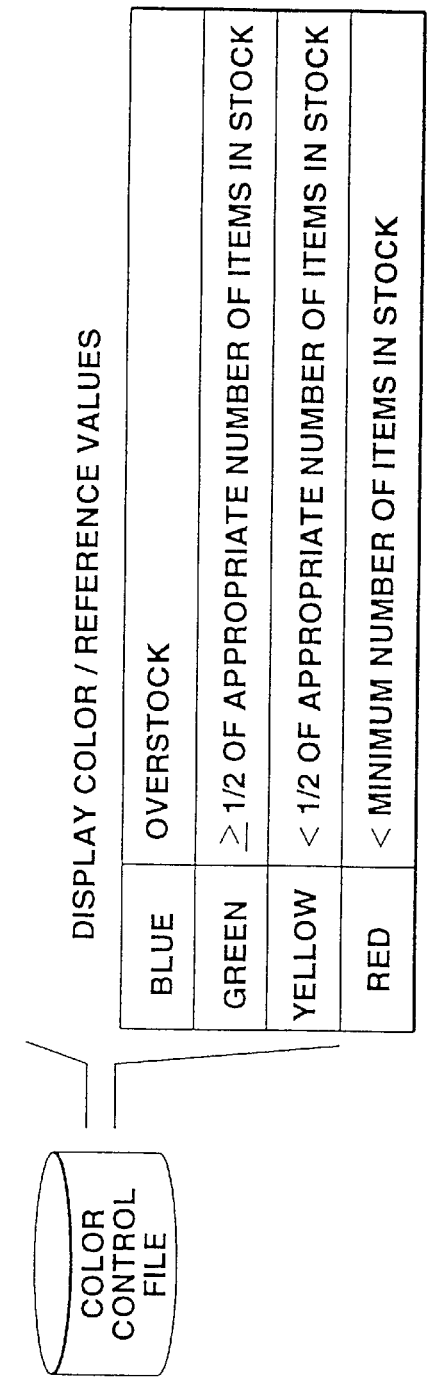

COLOR CONTROL FILE

| DISPLAY COLOR | REFERENCE VALUES |
|---|---|
| BLUE | OVERSTOCK |
| GREEN | ≥ 1/2 OF APPROPRIATE NUMBER OF ITEMS IN STOCK |
| YELLOW | < 1/2 OF APPROPRIATE NUMBER OF ITEMS IN STOCK |
| RED | < MINIMUM NUMBER OF ITEMS IN STOCK |

| COLOR CONTROL FILE | | | |
|---|---|---|---|
| | a | GREEN | ≤ 50 % OF CREDIT LIMIT AMOUNT |
| | b | YELLOWISH GREEN | 51% TO 79% OF CREDIT LIMIT AMOUNT |
| | c | YELLOW | 80% TO 99% OF CREDIT LIMIT AMOUNT |
| | d | RED | 100% OF CREDIT LIMIT AMOUNT |

| CUSTOMER | RECEIVABLE ACCOUNTS | CREDIT LIMIT |
|---|---|---|
| AAA STORE | ¥ 50,000 | ¥ 1,000,000 |
| ABC STORE | ¥ 850,000 | ¥ 1,000,000 |
| BBC STORE | ¥ 1,100,000 | ¥ 1,000,000 |

DOCUMENT OUTPUT APPARATUS

TECHNICAL FIELD

The present invention relates to a document output apparatus for outputting a document made up of plural cells to each of which data is assigned, the document output apparatus coloring the cells in accordance with the data assigned thereto.

BACKGROUND ART

In recent years, bus business-management office computers have been described which and general-purpose computers use a variety of application programs, such as spreadsheet and database programs, and therefore have a document output function for outputting obtained document data in various formats.

To output a document, it is necessary to determine the definitions of the document format, the output form, etc. This is usually done by utilization of a document defining function of an application program. First of all, a document format is determined, and the items to be output into the document and the definitions of the items are determined. Then, the name of a record file to be output in a document is determined, and the manner in which the data is output is determined by looking at the document format displayed by a monitor.

The document, the details of which are determined as explained above, is displayed on the monitor, and in this state data is developed in each of the cells of the document. The data in the cells includes letters, numerals, and calculation results calculated based on plural items. The conventional document defining technology provides a function of permitting the data of the cells to be output in the manner determined for each of the cells. By use of this function, it is possible to designate the color in which the data in each cell is output.

As described above, the conventional application programs, such as spreadsheet and database programs, incorporate document defining technology, and this technology provides a function of permitting the data of cells to be output in the manner determined for the cells. Although the function of this conventional technology permits data to be output in the manner determined for each of the cells, the definitions have to be entered for each of the cells. It is therefore cumbersome to enter the definitions in which the data in the cells are output. Hence, it is difficult to make good use of the function of determining the manner in which cell data is output.

Although it is possible to change the output manner of cell data in the displayed state of the document, the procedure for changing the manner of output is complex. It is thus hard to make good use of the output format defining the function of cell data.

The definitions for determining the output manner in which cell data of a document is output includes not only coloring but also marking display and alarm display. If these definitions are used too much, the data displayed on a monitor may be hard to identify.

Accordingly, an object of the present invention is to provide a technique for enabling the data of each cell to be easily displayed in the color desirable for the data.

DISCLOSURE OF INVENTION

The present invention relates to a document output apparatus which outputs a document made up of plural cells each having data assigned thereto, the apparatus comprises:

plural color tables each storing plural color information corresponding to plural data values;

designating means for designating one color table from among the plural color tables;

retrieving means for retrieving color information corresponding to the data value of each of said plural cells; and output means for outputting the document, with each of said plural cells being indicated in a color corresponding to the color information retrieved by the retrieving means, in which the color information stored in one color table differs from that stored in another.

According to the present invention, it is easily to color the cells in the document based on the data assigned to each cell.

BRIEF DESCRIPTION OF DRAWINGS

FIG. 3 shows an example of a color information table stored in a color information memory;

FIGS. 4A and 4B show examples of color dictionary tables stored in a color dictionary memory;

FIGS. 5A, 5B and 5C show other examples of color dictionary tables stored in the color dictionary memory;

FIG. 6 shows an example of a document designing window;

FIGS. 7A, 7B and 7C show examples of sub-menu windows;

FIG. 9 shows an example of a document preview window;

FIG. 10 shows an example of a manner in which document preview window looks like after the color dictionary is replaced with another;

FIG. 14A shows an example of a color control file;

FIG. 14B shows an example of a sales item master file;

FIG. 14C shows an example of a display window;

FIG. 15 shows another example of a color control file;

FIG. 16 shows an example in which slip data is displayed;

FIG. 19A shows an example of a sales item master file;

FIG. 19B shows an example of a color control file;

BEST MODE OF CARRYING OUT THE INVENTION

The first embodiment of the present invention will now be described with reference to FIGS. 1 through 10.

Figure 1:
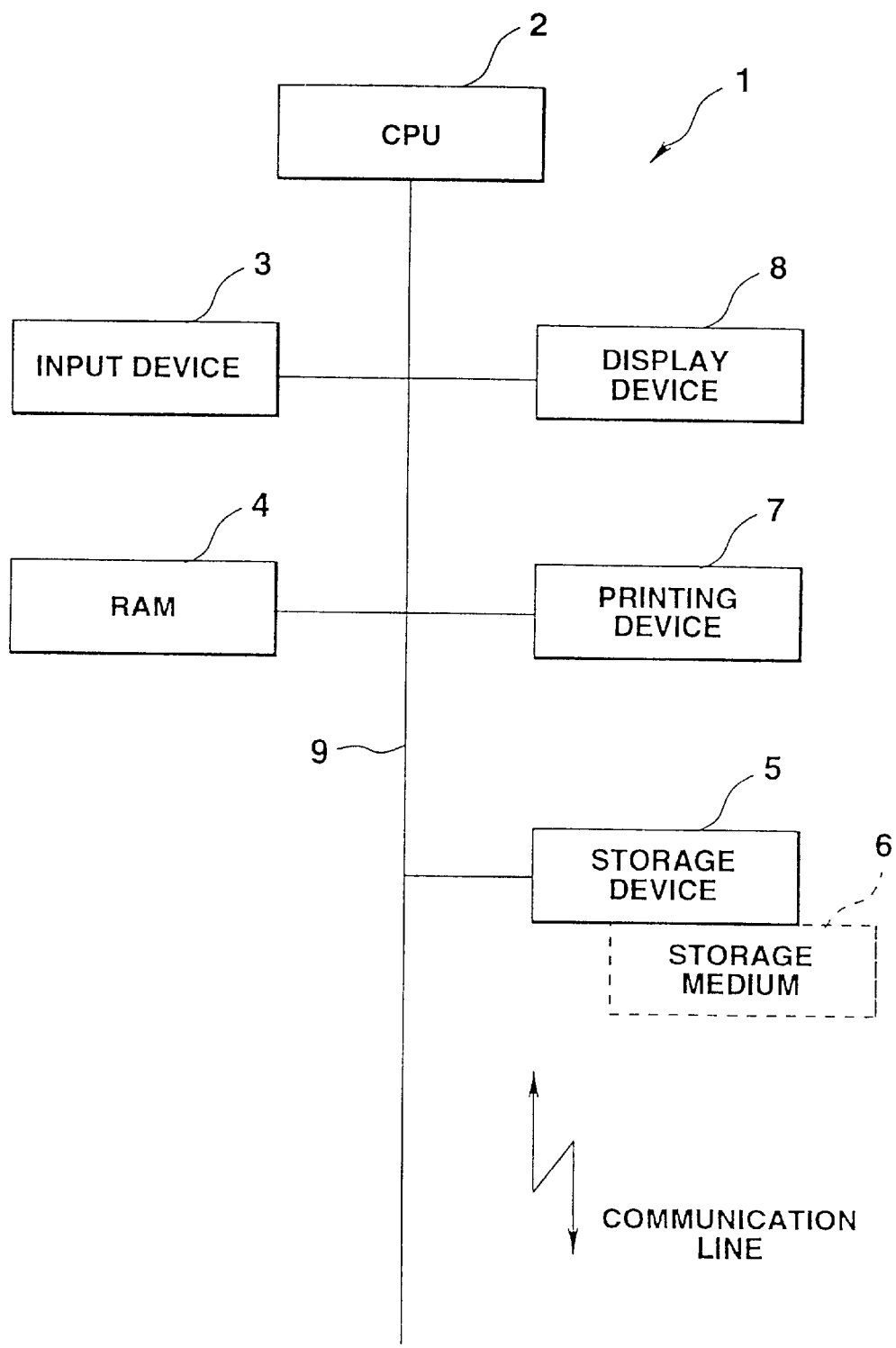
FIG. 1 is a block circuit diagram showing the major portion of a computer system according to the first embodiment of the present invention.

FIG. 1 is a block circuit diagram showing the major portion of a computer system 1 according to the first embodiment of the present invention.

Referring to FIG. 1, the computer system 1 comprises a CPU (central processing unit) 2, an input device 3, a RAM 4, a storage device 5 a storage medium 6, a printing device 7 and a display device 8. These devices are connected together by means of a bus line 9.

The CPU (Central Processing Unit) 2 stores an application program specified among the Windows (trade-mark) system programs as a GUI (graphic user interface) program and the various application programs based on the Windows system which are stored in the storage device 5 and various instructions or data inputted from the input device 3 in a work memory 4a in the RAM 4. According to the input instruction and input data, various processings are operated based on the application programs stored in the RAM 4. The result of processing is stored in the work memory 4a in the RAM 4, and it is displayed in the display device 8. The result of processing stored in the work memory 4a is saved in a given address of the storage device 5 which is instructed by the input device 3.

Furthermore, in a document printout process described below as an output process of document data stored in a document data memory 4b in the RAM 4, the CPU 2 obtains a color information table which defines a coloring information corresponding to each cell data in the document data to be printed out. Based on a dictionary specification information which is set in the color information table, a color dictionary table is read from a color dictionary memory 4e. Based on color information which is set according to an evaluation condition in the read color dictionary table, the CPU 2 is operated in such a manner that specified cell data is printed out at a specified color by the printing device 7.

The input device 3 comprises a keyboard provided with a cursor key, a numerical input key, various function keys, etc. and a mouse being a pointing device. A press signal indicative of the pressed key on the keyboard is outputted to the CPU 2. An operation signal by the mouse is outputted to the CPU 2.

Figure 2:
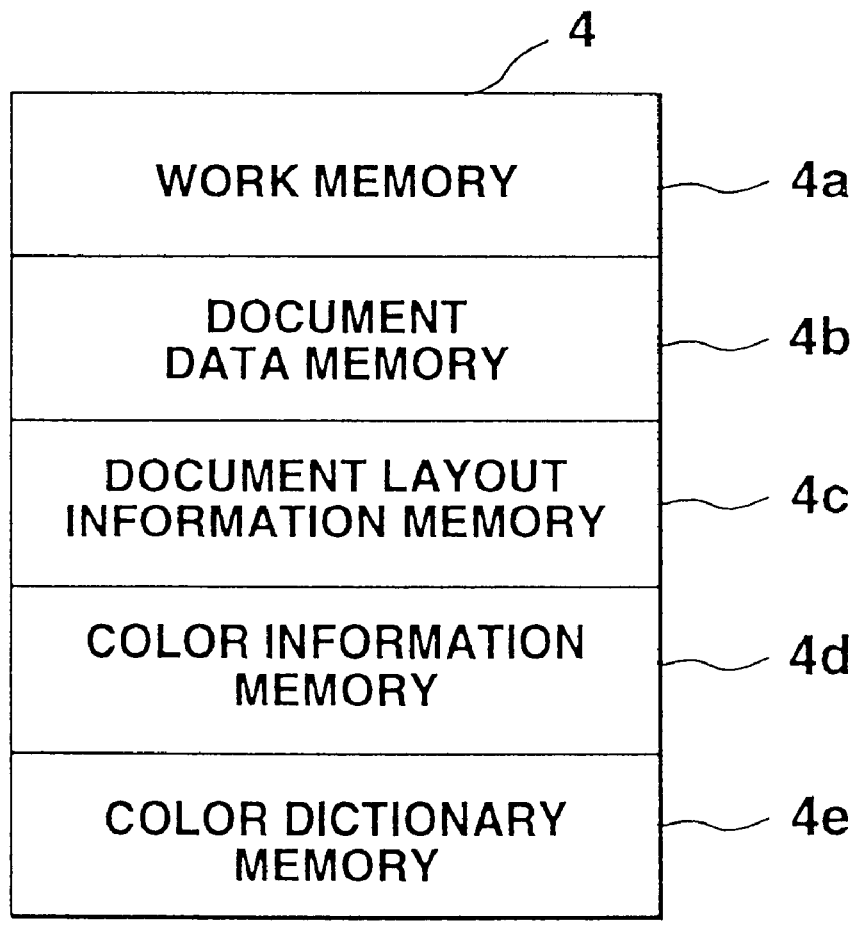
FIG. 2 shows the structure of a RAM of the first embodiment.

As shown in FIG. 2, the RAM (random access memory) 4 comprises a work memory 4a, a document data memory 4b, a document layout information memory 4c, a color information memory 4d, and a color dictionary memory 4e. The work memory 4a stores designated application programs, input-instructions, input data and results of processing. The document data memory 4b stores document data. The document layout information memory 4c stores the layout information on a document. The color information memory 4d stores color information tables in which definition information regarding a color used for each of the cell data are recorded along with dictionary designating information. The color dictionary memory 4e stores color dictionary tables corresponding to the dictionary designating information recorded in the color information tables.

The storage device 5 has the storage medium 6 in which the program, the data, etc. are previously stored. The storage medium 6 comprises a magnetic recording media, an optical recording media or a semiconductor memory. The storage medium 6 is fixedly housed in the storage device 5, or the storage medium 6 is detachably mounted to the storage device 5. The storage medium 6 stores the Windows system program as the GUI, various application programs corresponding to the Windows system, the data processed by a document printout processing program and each processing program, etc.

Furthermore, the program, the data, etc. to be stored in the storage medium 6 may be transmitted from another equipment connected via a communication line, etc. The present equipment does not comprise the storage device 5 and another equipment connected via the communication line, etc. is provided with the storage device 5 so that the program and the data stored in the storage medium 6 can be used via the communication line.

The printing device 7 includes a color printer for printing out a printout data (the document data, etc.) supplied from the CPU 2 with the specified color.

The display device 8 comprises a CRT (Cathode Ray Tube) display and the like. A display data supplied from the CPU 2 is displayed with the specified color.

A description will now be given of the operation of the above embodiment.

An example of a color information table stored in the color information memory 4d of the RAM 4 will be described, referring to FIG. 3.

As shown in FIG. 3, in the color dictionary designating item, which is in the uppermost row, (color) dictionary designating information is defined. In the "cell" column, the numbers of the cells of interest (evaluated cell information) are defined. In the "color" column, colors in which the data in the cells are output are defined. In the "item color name" column, item color names corresponding to the cells of interest, i.e., the cells to be colored, are defined. In the "object item" column, positions where cells are actually output or printed in the designated color are defined.

In the dictionary designating item of the color information table shown in FIG. 3, an "objective reference for the current fiscal year" is set forth as a dictionary name. In the "item color name" column, "sales evaluation color", "monthly total evaluation color" and "semiannual total evaluation color" are set forth as item color names. In the color information table shown in FIG. 3, the cell positions defined in the "cell" column and those defined in the "object item" column are the same. In this case, cells to be evaluated and cells to be colored and output are the same. If the cell positions defined in the "cell" column and those defined in the "object item" column are different, cells to be evaluated and cells to be colored and output are different.

On the basis of the dictionary designating information defined in the dictionary designating item, one of the color dictionary tables stored in the color dictionary memory 4e of the RAM 4 is designated.

An example of a color dictionary document stored in the color dictionary memory 4e will be described with reference to FIGS. 4A through 5C.

Various color dictionary tables are applicable to the present embodiment, as shown in FIGS. 4A and 4B and 5A through 5C for example. In each of these color dictionary designating tables, the name of a dictionary is defined in the "dictionary name" row, the item color name of a cell to be colored is defined in the "item color name" column (i.e., the column in which the item to be defined is set forth), numeric conditions (evaluating conditions) used for determining whether or not data are item color names are set forth in the "evaluation condition" column. In the "color" column, output-color gradations are set forth in association with the numeric conditions defined in the "evaluating condition" column.

The color dictionary document shown in FIG. 4A is a document wherein the dictionary name is "average reference of last fiscal year." In the "item color name" column, "monthly evaluation color", "sales evaluation color" and "semiannual evaluation color" are defined. In the "evaluation condition" column, ">18,000", ">13,000", ">11,000" and ">3,000" are set forth as numeric conditions corresponding to the "monthly evaluation color", ">2,500", ">1, 500" and ">500" are set forth as numeric conditions corresponding to the "sales evaluation color", and ">12,000" is set forth as a numeric condition corresponding to the "semiannual evaluation color". In the "color" column, "255", "200", "100" and "50" are set forth as the numbers of red-output gradations corresponding to the numeric conditions of the "monthly evaluation color", "255", "120" and "60" are set forth as the numbers of blue-output gradations corresponding to the numeric conditions of the "sales evaluation color", and "255", is set forth as the number of green-output gradations corresponding to the numeric conditions of the "semiannual evaluation color".

The color dictionary document shown in FIG. 4B is a document wherein the dictionary name is "objective reference for the current fiscal year." In the "item color name" column, "monthly evaluation color", "sales evaluation color" and "semiannual evaluation color" are defined. In the "evaluation condition" column, ">20,000", ">15,000", ">10,000" and ">5,000" are set forth as numeric conditions corresponding to the "monthly evaluation color", ">3,000", ">2,000" and ">1,000" are set forth as numeric conditions corresponding to the "sales evaluation color", and ">15, 000" is set forth as a numeric condition corresponding to the "semiannual evaluation color". In the "color" column, "255", "200", "100" and "50" are set forth as the numbers of red-output gradations corresponding to the numeric conditions of the "monthly evaluation color", "255", "120" and "60" are set forth as the numbers of blue-output gradations corresponding to the numeric conditions of the "sales evaluation color", and "255", is set forth as the number of green-output gradations corresponding to the numeric conditions of the "semiannual evaluation color".

The color dictionary document shown in FIG. 5A is a document wherein the dictionary name is "monthly sales evaluation." In the "item color name" column, "monthly evaluation color" is defined. In the "evaluation condition" column, ">20,000", ">15,000", ">10,000" and ">5,000" are set forth as numeric conditions corresponding to the "monthly evaluation color". In the "color" column, "255", "200", "100" and "50" are set forth as the numbers of red-output gradations corresponding to the numeric conditions of the "monthly evaluation color".

The color dictionary document shown in FIG. 5B is a document wherein the dictionary name is "sales evaluation for each sales item." In the "item color name" column, "sales evaluation color" is defined. "255", "120" and "60" are set forth as the numbers of blue-output gradations corresponding to the numeric conditions of the "sales evaluation color".

The color dictionary document shown in FIG. 5C is a document wherein the dictionary name is "For Storage". In this document, no data is defined in the "item color name" column, the "evaluation condition" column, or the "color" column. When this color dictionary document is selected, a colorless or monochromatic document is printed.

Needless to say, the color dictionary document applicable to the present embodiment are not limited to those mentioned above. A dictionary name, an item color name, an evaluation condition and color information can be freely determined when preparing a color dictionary document.

On the basis of the color information defined in each of the color information tables shown in FIGS. 3, 4A, 4B, 5A, 5B and 5C, designated cell data of a document are colored when the document is printed in the document printing process mentioned below.

The operation for applying the color information tables shown in FIGS. 3, 4A through 4B and 5A through 5C to an actual document will be described, referring to FIGS. 6 and 7A through 7C (which illustrate how a document is designed).

FIG. 6 shows an example of how a document is designed. According to the example shown in FIG. 6, the layout information on a designated document is read out from the document layout information memory 4c of the RAM 4 and displayed on the display device 8. Designated cell areas of the document are processed in accordance with the definitions stored in the color information. In the example shown in FIG. 6, a designated document layout is displayed in the document area defined by columns A–J and rows 1–9. In the upper portion of the document display area, the operation items, such as "file", "edit", "format", "cell background color" and "color dictionary" are indicated.

To perform the operation regarding the definitions of color information, the "cell background color" is selected from the operation items. A pull-down menu is displayed in response to this selection, and a desired color is designated by use of the pull-down menu. Subsequently, the "color dictionary" is selected from the operation items. A pull-down menu is displayed in response this selection, and a desired color dictionary is designated by use of the pull-down menu.

Within the document cell area defined by B2 to I9, a cell area for which color information is to be defined and an item color to be used for the cell area are designated. For example, when the cell area corresponding to the monthly total (i.e., cells C9–H9 indicated by 1*) is designated, the sub menu shown in FIG. 7A is displayed, and the designated cell area is defined as "C9;H9" in the cell item. From the list of item color names displayed in the sub-menu, "monthly total evaluation color" is selected and indicated with half-tone dot meshing.

When the cell area corresponding to the semiannual total (i.e., cells I3–I8 indicated by 2*) is designated, the sub menu shown in FIG. 7B is displayed, and the designated cell area is defined as "I3;I8" in the cell item. From the list of item color names displayed in the sub-menu, "semiannual total evaluation color" is selected and indicated with half-tone dot meshing.

When the cell area corresponding to the sales evaluation (i.e., cells C3–H8 indicated by 3*) is designated, the sub menu shown in FIG. 7C is displayed, and the designated cell area is defined as "C3;H8" in the cell item. From the list of item color names displayed in the sub-menu, "sales evaluation color" is selected and indicated with half-tone dot meshing.

The color information table shown in FIG. 3 is prepared by defining color information in the procedures mentioned above. The color information table, thus prepared, is stored in the color information memory 4d of the RAM 4.

Figure 8:
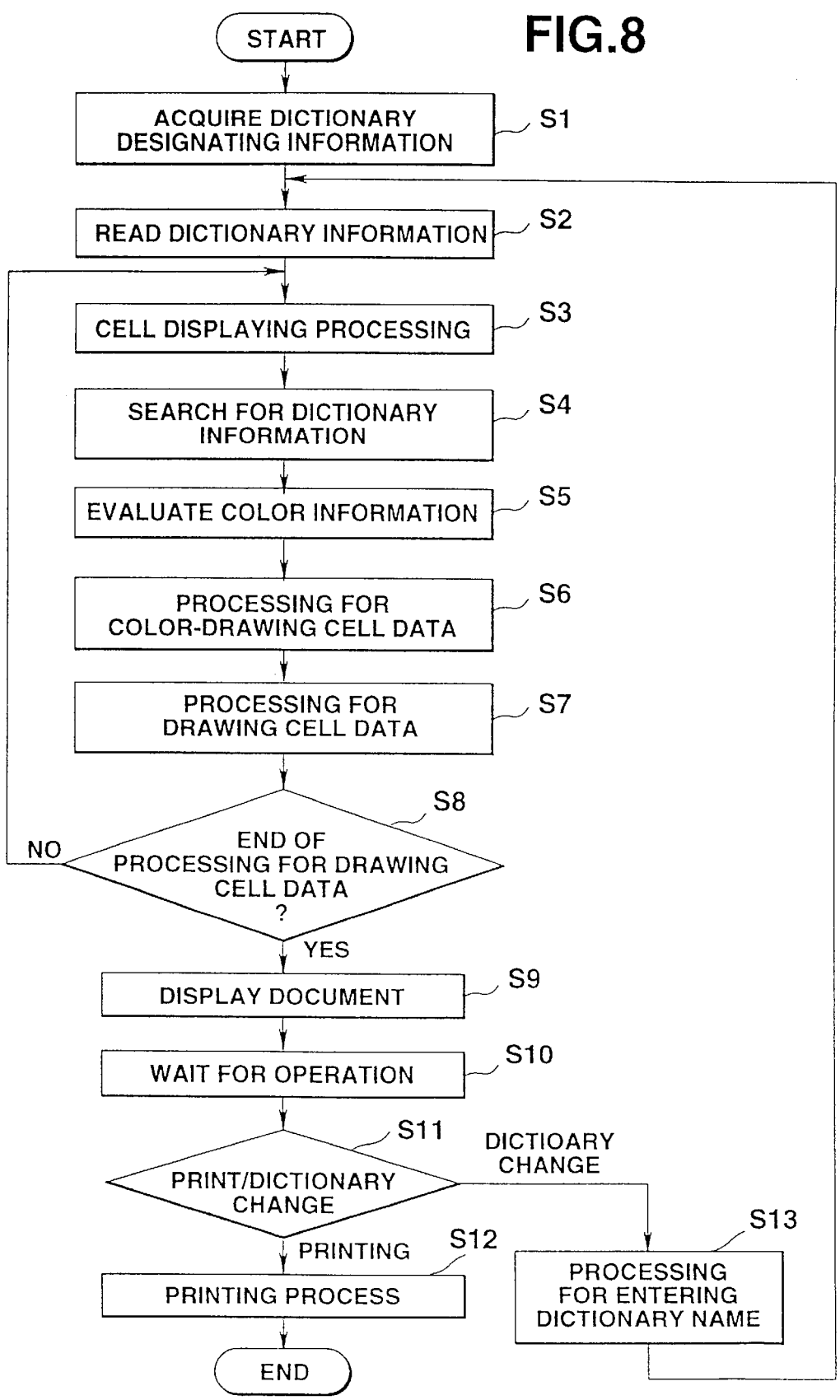
FIG. 8 is a flowchart showing document printing processing.

The document printing process to be executed by the CPU 2 will be described, referring to the flowchart shown in FIG. 8. The programs for realizing the functions described in the flowchart are stored in the storage medium 6 as program codes which can be read by the CPU 2.

First of all, operation item "print" is designated in the sheet shown in FIG. 6, so as to select the document to be printed. In response to this designation, the dictionary designating information predetermined for printing the document data in colors is read from the color dictionary information defined in the color dictionary designating column of the color information table stored in the color information memory 4d of the RAM 4 (step S1). The designated color dictionary document is read from the color dictionary memory 4e of the RAM 4 and developed in the work memory 4a (step S2).

Subsequently, the layout information on the designated document to be printed is read out from the document layout information memory 4c. In accordance with this layout information, the processing for displaying data in the first cell of the document data is executed. That is, the data to be drawn is developed in the work memory 4a of the RAM 4 (step S3). Then, the color dictionary document read in step S2 is searched (step S4), and the color evaluation information corresponding to the cell item to be displayed is obtained (step S5). On the basis of this color evaluation information, the designated cell is drawn in the designated color (step S6).

To be more specific, the evaluation condition corresponding to the numeric data assigned to the designated cell is determined on the basis of the item color name (which is defined in the "item color name" column in association with the designated cell position in the color information table) and the evaluation condition corresponding to the same item color name defined in the "item color name" column of the color dictionary document shown in FIGS. 4A, 4B, 5A, 5B or 5C. On the basis of the evaluation condition, the designated cell is colored in accordance with the color and gradation data defined in the "color" column.

Thereafter, the cell data (numeric data) assigned to the designated cells are drawn (step S7), and then it is determined whether or not the data assigned to all cells have been drawn (step S8). If the data on all cells have not been drawn, then the flow returns to step S3, so as to draw the data assigned to the next cell. After this, the processing for retrieving dictionary information, the processing for retrieving color information, the processing for coloring a cell and the processing for drawing cell data (steps S4–S7) are repeatedly executed until the processing for all cells is completed. If the data on all cells have been drawn, then the document constituted by the cells drawn in colors is displayed on the display device 8 (step S9).

An example of a document which is constituted by the cells whose data have been processed for drawing and which is displayed on the color display device 8 in color is shown in FIG. 9. The example shown in FIG. 9 is a document preview display.

The document which is shown in FIG. 9 as a document preview display relates to "sales achievements". Of the cell format of the document, the cell regions of "sales achievements for April (C3–C8)", "sales achievements for May (D3–D8)", "sales achievements for June (E3–E8)" are processed in accordance with the evaluation conditions of the "monthly evaluation color" of the item color name of the color dictionary document entitled "objective reference for the current fiscal year" shown in FIG. 4B. That is, the monthly total cells are displayed in colors.

For example, the numeric data entered in cells C3–C6, namely "1,565", "1,474", "1,313", "1,254", "1,126" and "1,045", satisfy the evaluation condition ">3,000". These cells are therefore indicated in the designated color (R) and with gradation 50. Likewise, the numeric data entered in cells E3–E6, namely "3,348", "3,252", "3,135", "3,032", "3,548" and "3,376", satisfy the evaluation condition ">11, 000". These cells are therefore indicated in the designated color (R) and with gradation 100.

The sub-window shown in FIG. 9 is the one that appears when the "color dictionary" operation item at the uppermost row of the document display frame is selected. The sub-window shown in FIG. 9 is followed by the operation mentioned below.

With the document shown in FIG. 9 displayed on the display device in colors, an operation the user designates from the mouse of the input device 3 is waited for (step S10). In other words, the subject apparatus is kept in the stand-by state until the user selects one of "file", "previous page", "next page", "print" and "color dictionary change", which are shown at the upper portion of the document display frame shown in FIG. 9. In response to the user's selection, it is determined whether the operation item corresponds to "print" or "color dictionary change" (step S11).

If the operation item corresponds to "print", the document data shown in FIG. 9 is printed in colors on the predetermined printing paper by means of the printing device 8 (step S12), and the processing is brought to an end. On the other hand, if the operation item corresponds to "color dictionary change", the sub-window shown in FIG. 9 is displayed, and the user is urged to designate one of the color dictionary names listed in the color dictionary sub-window (step S13). In the color dictionary sub-window shown in FIG. 9, the "objective reference for the current fiscal year" is depicted as being designated. A state where another color dictionary name is designated by operating the mouse is shown in FIG. 10.

In the color dictionary sub-window shown in FIG. 10, the color dictionary entitled "monthly sales evaluation" is designated by operating a mouse. In order to read out the color dictionary document corresponding to the designated color dictionary "monthly sales evaluation" from the color dictionary memory 4d of the RAM 4, the processing shown in step S2 is executed. After reading out the color dictionary "monthly sales evaluation", step S3 is executed. In this step, data display processing is executed, beginning with the first cell of the document. Thereafter, the processing for retrieving dictionary information, the processing for retrieving color information, the processing for coloring a cell and the processing for displaying cell data (steps S4–S7) are repeatedly executed until the processing for all cells is completed.

As a result, the data of each of the "monthly sales" cell regions of the document is displayed on the display device 8 in the color designated in accordance with the evaluation conditions of the item color name defined in the color dictionary document entitled "monthly sales evaluation", as indicated in FIG. 10. The manner in which the data in each cell is colored in the document shown in FIG. 10 is similar to that described with reference to FIG. 9.

When "print" is selected from the operation items (namely, "file", "previous page", "next page", "print" and "color dictionary change" displayed at the upper portion of the document display frame shown in FIG. 10) by means of a mouse, the printing device 7 prints the document data shown in FIG. 10 in colors. The manner in which cells of the document are colored can be changed by designating "color dictionary change" again to specifying the dictionary name.

As described above, the computer system 1 of the first embodiment comprises the RAM 4 including the color information memory 4d and the color dictionary memory 4e. In the color information memory 4d, a color information table is stored as a document definition file. The color information table contains definition information for defining the color information with respect to each of the cell data of the document, and also contains dictionary designating information. In the color dictionary memory 4e, a variety of color dictionary tables corresponding to the dictionary designating information of the color information table are stored. In the color dictionary document, the positions of the cells to be evaluated, the item color names of the cells, and the positions of the cells to be colored can be defined in an arbitrary manner. In each of the color dictionary tables, evaluation conditions for each item color name and color information (the color and the number of gradations) based on the evaluation conditions are defined beforehand. Accordingly, it is not necessary to define a color information table and a color dictionary document for each of the documents, and the time required for defining color information can be short.

In the document printing process, the cells or cell regions designated in a document are printed in colors in accordance with the color information table and color dictionary document. Moreover, since the color dictionary document can be replaced with another, the designated items or cell regions can be printed in a desirable color. Therefore, the designated cells or items can be colored on the basis of their evaluation conditions and can therefore be easily distinguished from others.

In the data analysis using the document data, the results of analysis can be output in colors unique to them. By applying this feature to an application program provided with a document-preparing function, the data output function of that application program can be remarkably enhanced.

In the above description of the document printing process of the first embodiment, reference was made to the case where the background color of a cell to be colored was changed in accordance with the evaluation conditions corresponding to the data value of the cell to be evaluated. Needless to say, however, the data color of the cell to be colored may be changed instead.

In the first embodiment mentioned above, each of the items of a color information table can be arbitrarily defined. However, this in no way restricts the present invention, and each of the items of a color dictionary document may be changed. In this case, the evaluation conditions of a cell to be evaluated can be arbitrarily determined, and the color output format of a document to be displayed or printed can be easily determined in various manners. Accordingly, detailed analysis of cell data is enabled by utilization of output colors.

A description will now be given of the second embodiment of the present invention. FIGS. 11 through 17 show a computer system according to the second embodiment of the present invention.

Figure 11:
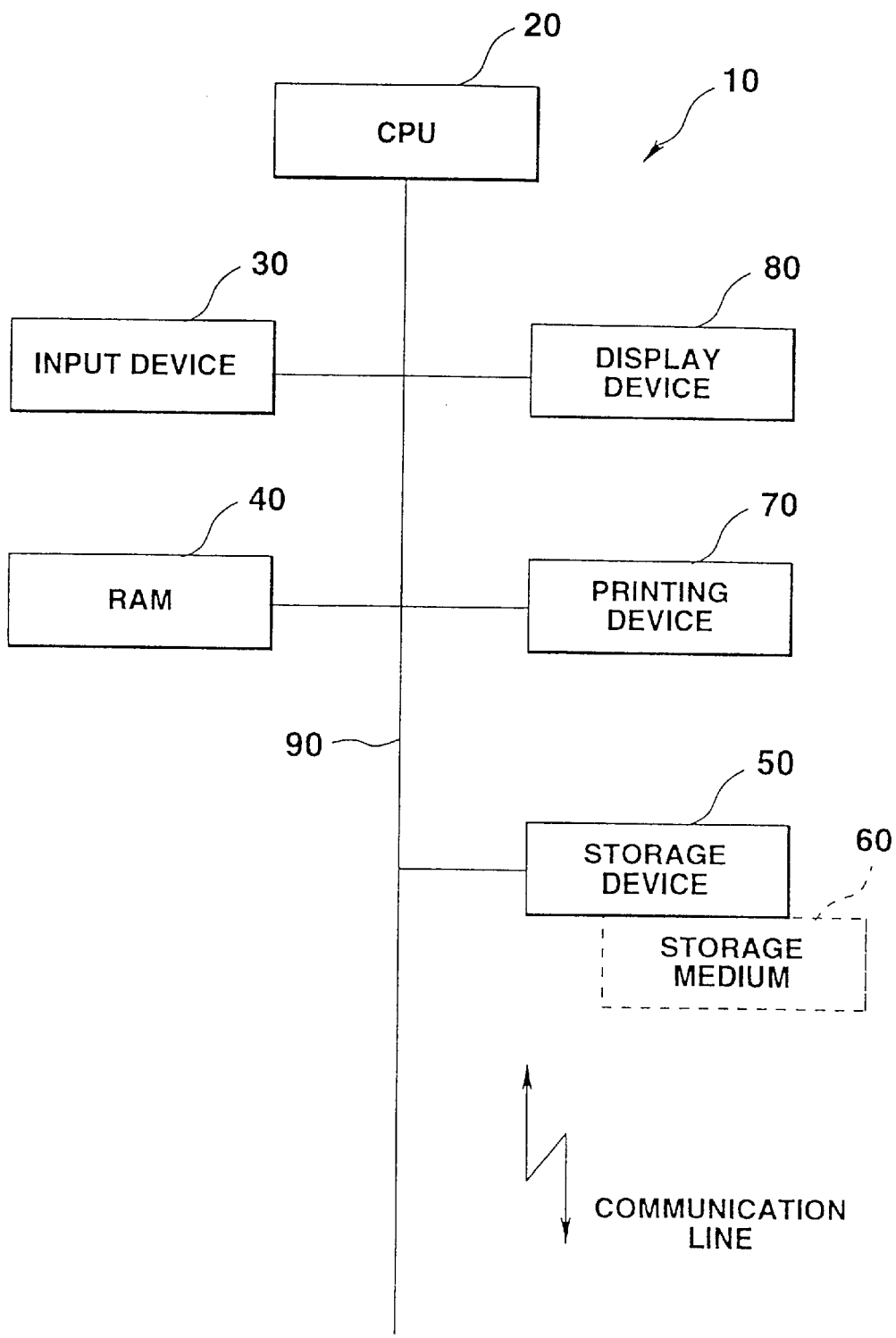
FIG. 11 is a block circuit diagram showing the major portion of a computer system according to the second embodiment of the present invention.

FIG. 11 is a block circuit diagram showing the major portion of a computer system 10 of the second embodiment.

Referring to FIG. 11, the computer system 10 comprises a CPU (central processing unit) 20, an input device 30, a RAM 40, a storage device 50, a storage medium 60, a printing device 70 and a display device 80. These devices are connected together by means of a bus line 90.

The CPU (Central Processing Unit) 20 stores an application program specified among the Windows system programs as a GUI (graphic user interface) programs and the various application programs based on the Windows system which are stored in the storage device 50 and various instructions or data inputted from the input device 30 in a work memory 40a in the RAM 40. According to the input instruction and input data, various processings are operated based on the application programs stored in the RAM 40. The result of processing is stored in the work memory 40a in the RAM 40, and it is displayed in the display device 80. The result of processing stored in the work memory 40a is saved in a given address of the storage device 50 which is instructed by the input device 30.

The processing for outputting the document data stored in the document data memory 40b of the RAM 40 involves document displaying processing to be mentioned later. In this processing, the CPU 20 reads out a sales item master file from the sales item master memory 40b of the RAM 40. Then, the CPU 20 compares the number of sales items ordered with the number of sales items being in stock for each sales item by referring to the sales item master file. On the basis of this comparison, the CPU 20 colors the sales item names such that their colors correspond to the color information of the related reference value stored in the color control file memory 40c of the RAM 40.

The input device 30 comprises a keyboard provided with a cursor key, a numerical input key, various function keys, etc. and a mouse being a pointing device. A press signal indicative of the pressed key on the keyboard is outputted to the CPU 20. An operation signal by the mouse is outputted to the CPU 20.

Figure 12:
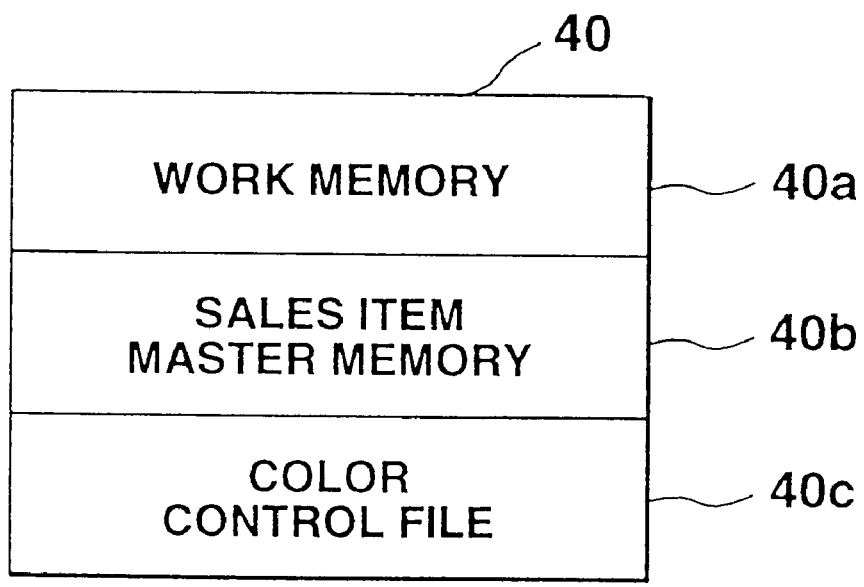
FIG. 12 shows the structure of a RAM of the second embodiment.

As shown in FIG. 12, the RAM (random access memory) 40 comprises a work memory 40a, a sales item master memory 40b, and a color control file memory 40c. The work memory 40a stores designated application programs, input instructions, input data and results of processing. The sales item master memory 40b stores plural sales item master files. The color control file memory 40c stores a color control files in which color control information corresponding to the respective sales item master files are defined.

The storage device 50 has the storage medium 60 in which the program, the data, etc. are previously stored. The storage medium 60 comprises a magnetic recording media, an optical recording media or a semiconductor memory. The storage medium 60 is fixedly housed in the storage device 50, or the storage medium 60 is detachably mounted to the storage device 50. The storage medium 60 stores the Windows system program as the GUI, various application programs corresponding to the Windows system, the data processed by a document printout processing program and each processing program, etc.

The printing device 70 includes a color printer for printing out a printout data (the document data, etc.) supplied from the CPU 20 with the specified color.

The display device 80 comprises a CRT (Cathode Ray Tube) display, liquid crystal display (LCD) device and the like. A display data supplied from the CPU 20 is displayed with the specified color.

A description will now be given of the operation of the second embodiment.

Figure 13:
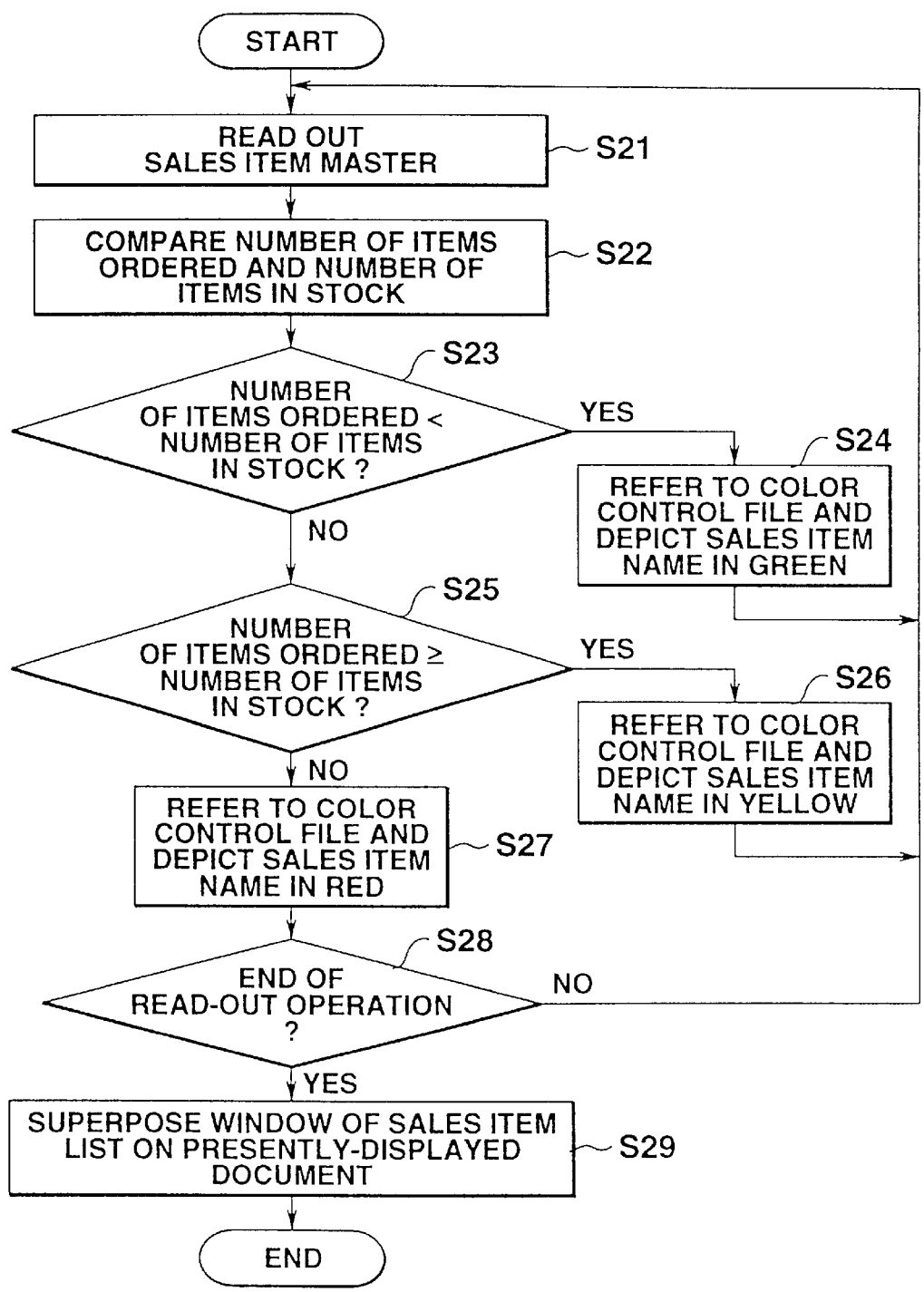
FIG. 13 is a flowchart showing document displaying processing.

The document displaying process to be executed by the CPU 20 will be described, referring to the flowchart shown in FIG. 13. The programs for realizing the functions described in the flowchart are stored in the storage medium 60 as program codes which can be read by the CPU 20.

First of all, an instruction for executing the document displaying process is entered from the input device 30, and a sales item master file regarding a sales item to be displayed is designated. In response to this designation, the CPU 20 starts the document displaying process. To be specific, the CPU 20 reads out the designated sales item master file (e.g., the file shown in FIG. 14B) from the sales item master memory 40b of the RAM 40 and develops the readout master file in the work memory 40a of the RAM 40 (step S21). By referring to the developed master file, the CPU 20 compares the number of sales items ordered with the number of sales items being in stock for each sales item (step S22). The CPU 20 determines whether the result of comparison satisfies the relationship "the number of sales items ordered"<"the number of sales items being in stock" (step S23).

Let us consider a case where the number of sales items being in stock is larger than the number of sales items ordered. An example of such a case is shown in FIG. 14B, where the former number of sales item "AAAAA" is "20" and the latter number of the same sales item is "10". In this case, the CPU 20 refers to a color control file (such as that shown in FIG. 14A) stored in the color control file memory 40c of the RAM 40. Since, in the color control file, "green" is predetermined for reference value a (the number of sales items being in stock is larger than the number of sales items ordered), the CPU 20 causes the sales item "AAAAA" to be colored in green (step S24). Thereafter, the flow returns to step S21.

If it is determined in step S23 that the number of sales items being in stock is equal to or smaller than the number of sales items ordered, it is determined whether or not the number of sales items being in stock satisfies the relationship "the number of sales items ordered"≧"the number of sales items being in stock">0 (step S25). An example of a case where this relationship is satisfied is the case of sales item "BBBBB" indicated in FIG. 14B. With respect to the. sales item "BBBBB", the number of sales items being in stock is 5, and the number of sales items ordered is 15. That is, the relationship in this case is 15≧5>0. Thus, the CPU 20 refers to the color control file (such as that shown in FIG. 14A) stored in the color control file memory 40c of the RAM 40. Since, in the color control file, "yellow" is predetermined for reference value b (the number of sales items being in stock is smaller than the number of sales items ordered but is greater than zero), the CPU 20 causes the sales item "BBBBB" to be colored in yellow (step S26). Thereafter, the flow returns to step S21.

The case where the number of sales items being in stock does not satisfy the relationship "the number of sales items ordered"≧"the number of sales items being in stock">0 is a case where the number of sales items being in stock is 0, as in the case of sales item "CCCCC" indicated in FIG. 14B. In this case as well, the CPU 20 refers to the color control file (such as that shown in FIG. 14A). Since, in the color control file, "red" is predetermined for reference value c (the number of sales items being in stock is zero), the CPU 20 causes the sales item "CCCCC" to be colored in red (step S27). Thereafter, it is determined in step S28 whether all sales item names have been read out from the sales item master file developed in step S21. If all sales item names have not yet been read out, the flow returns to step S21, so as to repeatedly execute the operation of reading out a sales item master file and the subsequent operations. If all sales items have been read out, step S29 is executed. In this step S29, a window showing a list of the sales items including those processed in steps S24, S26 and S27 is superposed on the presently displayed document, as indicated in FIG. 14C, and the processing is brought to an end.

As described above, in the document displaying process of the computer system 10 of the second embodiment, the number of sales items ordered and the number of sales items being in stock are compared with each other by referring to the sales item master file which is designated for display. In accordance with the color information which is defined in a color control file in association with the result of that comparison, the sales item name in question is displayed in the predetermined color. Owing to this feature, the stock for a given sales item is displayed distinctively from other sales items, and the user is reminded of the stock for each sales item. In addition, the stock data displayed on the screen is not complex and easy to understand. Hence, the user can easily grasp the stock state of each sales item.

According to the second embodiment, the color control file is provided independently. Due to this feature, a reference value and color information need not be defined for each sales item. Moreover, the reference value and color information can be determined with a high degree of freedom. Hence, the format in which data is displayed in colors can be arbitrarily determined.

The color control file is in no way limited to the contents (reference values) shown in FIG. 14A. For example, the color control file may have the contents (reference values) shown in FIG. 15. In the case of the control file shown in FIG. 15, the relationships between an input value and the number of sales items in stock are defined in the column of reference values, and the color information corresponding to the relationships (reference values) are defined in the column of colors. An example of slip data which is output by use of the color control file is shown in FIG. 16. In FIG. 16, the sales item name "AAAAA" is indicated as being displayed in green, and this color is defined in the color column of the color control file and selected in accordance with the comparison between the numeral entered in the number column ("8" in FIG. 16) and the number of sales items in stock (not shown in FIG. 16).

Figure 17:
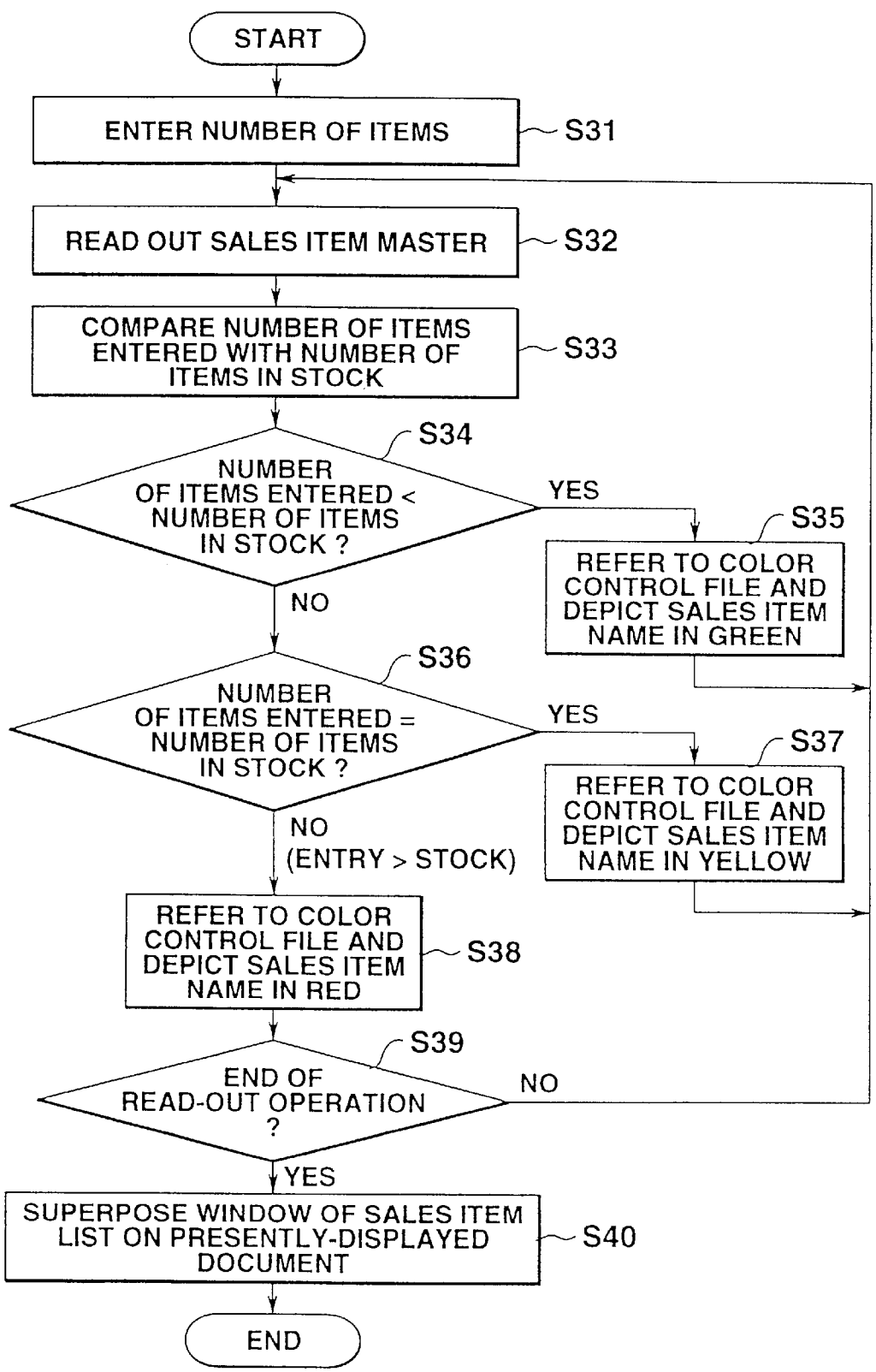
FIG. 17 is a flowchart showing document displaying processing.

This document displaying process will be described with reference to the flowchart shown in FIG. 17.

First of all, an instruction for executing the document displaying process is entered from the input device 30, and document data to be displayed is designated. In response to this designation, the CPU 20 starts the document displaying process. To be specific, the CPU 20 reads out the designated document data from the storage medium 60 of the storage device 50 and develops the readout document data in the work memory 40a of the RAM 40. The developed document data is displayed on the display device 80, as shown in FIG. 16. The number of sales items is entered into the number column of the displayed document data by operating the numeral keys of the keyboard (step S31). In response to this entry, the sales item master file corresponding to the document data is read out from the sales item master file memory 40b of the RAM 40 (step S32).

The number of sales items entered into the number column is compared with the number of sales items which is described in the sales item master file as being in stock (step S33). By this comparison, it is determined whether the relationship "the number of sales items entered"<"the number of sales items being in stock" is satisfied (step S34).

If the result of comparison shows that the relationship "the number of sales items entered"<"the number of sales items being in stock" is satisfied, the color control file shown in FIG. 15 is referred to. In the color control file, "green" is defined in the color column as corresponding to the relationship "the number of sales items entered"<"the number of sales items being in stock" of the reference value column. Therefore, the color information on "green" is acquired, and the sales item name "AAAAA" shown in FIG. 16 is colored in green (step S35).

If the result of comparison does not show that the relationship "the number of sales items entered"<"the number of sales items being in stock" is satisfied, then it is determined in step S36 whether the relationship "the number of sales items entered"="the number of sales items being in stock" is satisfied. If this relationship is satisfied, the color control file shown in FIG. 15 is referred to. In this color control file, "yellow" is defined in the color column as corresponding to the relationship "the number of sales items entered"="the number of sales items being in stock" of the reference value column. Therefore, the color information on "yellow" is acquired, and the sales item name "AAAAA" shown in FIG. 16 is colored in yellow (step S37).

If the check in step S36 does not show that the relationship "the number of sales items entered"="the number of sales items being in stock" is satisfied, the reference value of the color control file shown in FIG. 15 is "the number of sales items entered">"the number of sales items being in stock". Since "red" is defined in the color column as corresponding to this reference value, the color information on this color is acquired, and the sales item name "AAAAA" shown in FIG. 16 is colored in red (step S38). Thereafter, it is determined in step S39 whether all sales item names have been read out from the sales item master file read out in step S32. If all sales item names have not yet been read out, the flow returns to step S32, and the operation of reading out a sales item master file and the subsequent operations are repeatedly executed (steps S33 to S38). If all sales items have been read out, step S40 is executed. In this step, a window showing a list of the sales items including those processed in steps S35, S37 and S38 is superposed on the presently displayed slip, and the processing is brought to an end.

As described above, when a color control file shown in FIG. 15 is used in place of that shown in FIGS. 14A through 14C, sales item names can be displayed in colors which are based on the comparison between the number of sales items entered and the number of sales items being in stock.

A description will now be given of a third embodiment of the present invention. FIGS. 18A through 21B show a computer system according to the third embodiment of the present invention.

In the second embodiment mentioned above, the sales item names described in a sales item master file are displayed in colors on the basis of the relationships defined in the sales item master file, i.e., the relationships between the number of sales items ordered or entered and the number of sales items being in stock. In the third embodiment, reference will be made to a case where the actual number of sales items which are presently in stock and the appropriate number of sales items which should be in stock are compared with each other by referring to the sales item list, and where the ratio of the actual number to the appropriate number is displayed as a colored bar graph.

Since the computer system employed in the third embodiment is similar to that employed in the second embodiment, illustration and explanation of the structure thereof will be omitted.

Figures 18A, 18B:
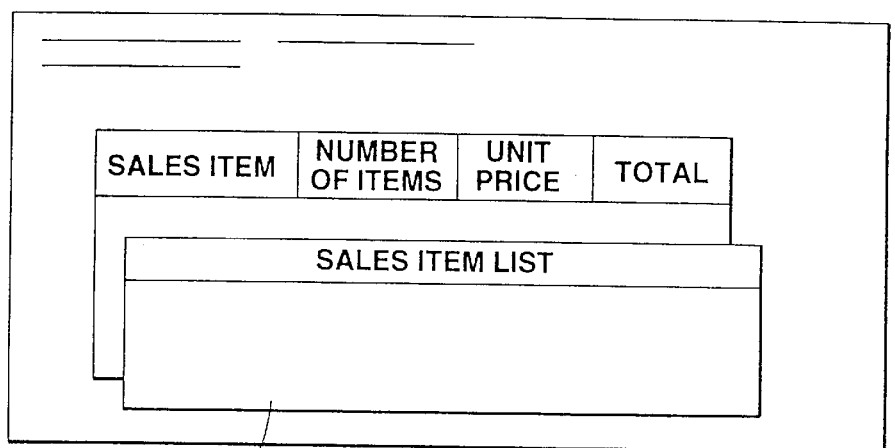
FIG. 18A shows an example of a manner in which a sales item list window is displayed in the third embodiment.
FIG. 18B is an example of an enlarged view of the list.

In the slip data-inputting operation of the inventory management of sales items, a sales item list is displayed to select sales items, as shown in FIG. 18A. For each of the selected sales items, the number of items actually in stock is displayed as a colored bar graph, as shown in FIG. 18B. In the sales item master file 40b, "appropriate number of items in stock", "minimum number of items in stock" and "actual number of items presently in stock" are recorded beforehand for each of the sales items, as shown in FIG. 19A. Of these three kinds of data, the data on the "appropriate number of items in stock" is displayed in color. In addition, a color control file is stored in the color control file memory 40c of the RAM 40, as shown in FIG. 19B. The color control file contains data on reference values based on which the bar graph representing the ratio of the "actual number of items presently in stock" to the "appropriate number of items in stock" is colored. The color control file also contains color information corresponding to the reference values. In accordance with the contents defined in the color control file, the bar graph representing the "number of items in stock" is colored and displayed.

Figure 20:
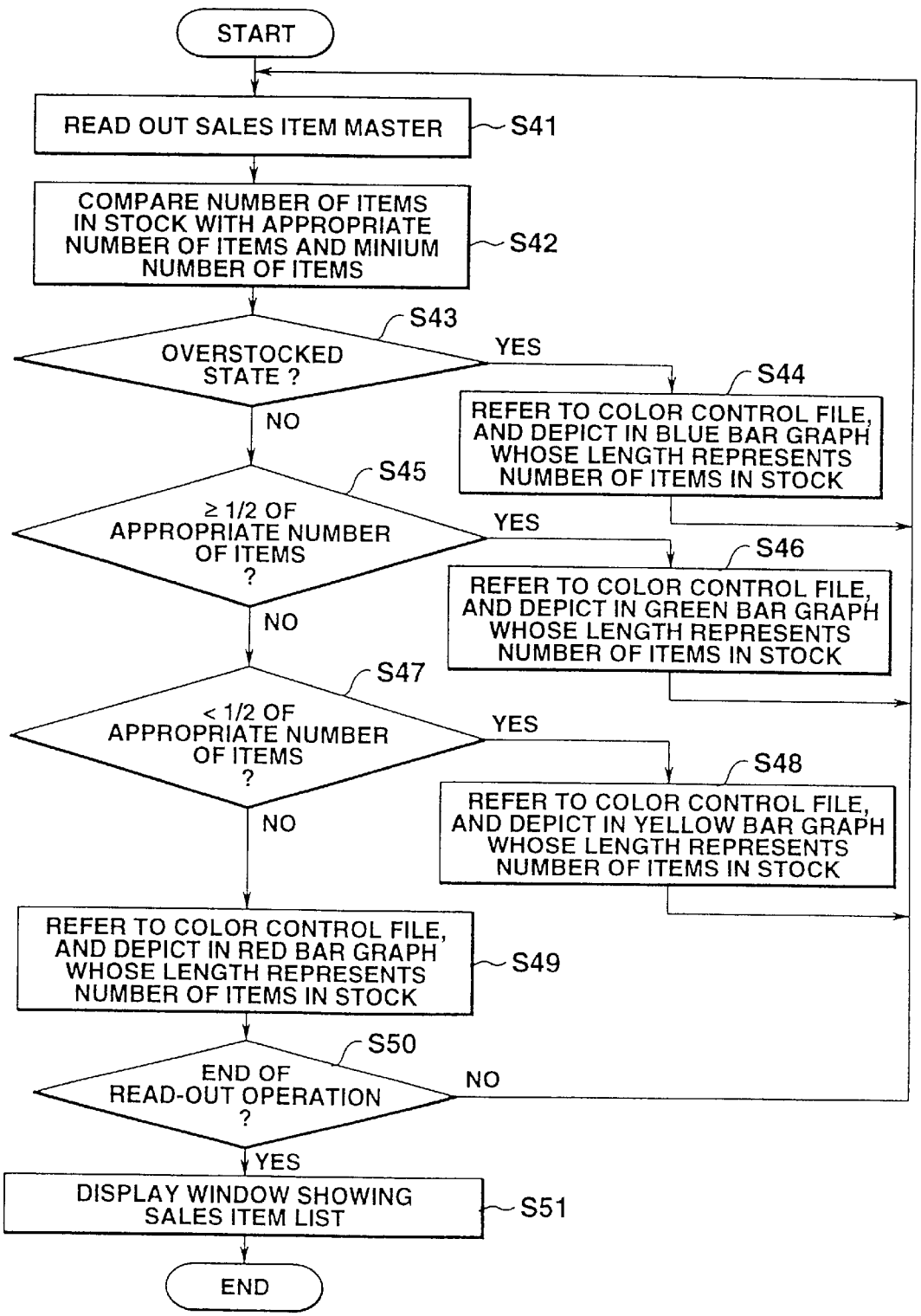
FIG. 20 is a flowchart showing stock displaying processing.

The stock display processing, which is executed by the CPU 20 to enable the bar graph representing the number of items in stock to be colored and displayed, will be described with reference to the flowchart shown in FIG. 20.

First of all, an instruction for executing the stock displaying process is entered from the input device 30, and the sales item master file to be displayed is designated. In response to this designation, the CPU 20 starts the stock displaying process. To be specific, the CPU 20 reads out the designated sales item master file from the sales item master memory 40b of the RAM 40 and develops the readout master file in the work memory 40a of the RAM 40 (step S41). By referring to the developed master file, the CPU 20 compares the actual number of items presently in stock with the minimum number of items which should be kept in stock and the appropriate number of items in stock, for each sales item (step S42). On the basis of these comparison, the CPU 20 determines whether or not each sales item is in the overstocked state (step S43).

If it is determined that a given sales item is in the overstocked state, the color control file shown in FIG. 19B is referred to. Since "blue" is defined in the color column as corresponding to the reference value "overstock", the color information on this color is acquired, and the bar graph, the length of which represents the ratio of the actual number of items presently in stock to the appropriate number of items lin stock, is colored in blue (step S44), as can be seen in FIG. 18B. Thereafter, the flow returns to step S41.

In FIG. 18B, the number of sales items "BBBBB" is 80, and this sales item is therefore in the overstocked state. The length of the bar graph represents the ratio of the actual number of items presently in stock to the appropriate number of items in stock, and the bar graph of this length is colored in blue.

If it is determined that a given sales item is not in the overstocked state, it is determined in step S45 whether or not the actual number of items presently in stock is equal to or greater than ½ of the appropriate number of items in stock. If the check shows that the actual number of items presently in stock is equal to or greater than ½ of the appropriate number of items in stock, the color control file shown in FIG. 19B is referred to. Since "green" is defined in the color column as corresponding to the reference value "≧½ of the appropriate number of items in stock", the color information on this color is acquired, and the bar graph, the length of which represents the ratio of the actual number of items presently in stock to the appropriate number of items in stock, is colored in green (step S44), as can be seen in FIG. 18B. Thereafter, the flow returns to step 41.

In FIG. 18B, the number of sales items "AAAAA" is 60 and is greater than ½ of the appropriate number of items in stock. The length of the bar graph represents the ratio of the actual number of items presently in stock to the appropriate number of items in stock, and the bar graph of this length is colored in green.

If it is determined that the actual number of items presently in stock is not equal to or greater than ½ of the appropriate number of items in stock, then it is determined in step S47 whether the actual number of items presently in stock is equal to or larger than the minimum number of items in stock but is smaller than ½ of the appropriate number of items in stock. If this is the case, the color control file shown in FIG. 19B is referred to. Since "yellow" is defined in the color column as corresponding to the reference value "<½ of the appropriate number of items in stock", the color information on this color is acquired, and the bar graph, the length of which represents the ratio of the actual number of items presently in stock to the appropriate number of items in stock, is colored in yellow (step S48), as can be seen in FIG. 18B. Thereafter, the flow returns to step S41.

In FIG. 18B, the number of sales items "DDDDD" is 20 and is smaller than ½ of the appropriate number of items in stock. The length of the bar graph represents the ratio of the actual number of items presently in stock to the appropriate number of items in stock, and the bar graph of this length is colored in yellow.

If it is determined that the actual number of items presently in stock is smaller than the minimum number of items in stock, then the actual number of items presently in stock is regarded as corresponding to the reference value "<minimum number of items in stock" defined in the color control file shown in FIG. 19B. Since "red" is defined in the color column as corresponding to this reference value, the color information on this color is acquired, and the bar graph, the length of which represents the ratio of the actual number of items presently in stock to the appropriate number of items in stock, is colored in red (step S49), as can be seen in FIG. 18B.

In FIG. 18B, the number of sales items "CCCCC" is 10 and is smaller than the minimum number of items in stock. The length of the bar graph represents the ratio of the actual number of items presently in stock to the appropriate number of items in stock, and the bar graph of this length is colored in red.

Thereafter, it is determined in step S50 whether or not all sales items have been read out from the sales item master file read out in step S41. If all sales items have not yet been read out, the flow returns to step S41, and the operation of reading out a sales item master file and the subsequent operations are repeatedly executed (steps S42 to S49). If all sales items have been read out, step S51 is executed. In this step, a window showing a list of the sales items including those processed in steps S44, S46, S48 and S49 is superposed on the presently displayed slip, and the processing is brought to an end.

As described above, the computer system according to the third embodiment is featured by its stock display process. In this process, color information defined in the color control file is acquired on the basis of the ratio of the actual number of items presently in stock to the appropriate number of items in stock, and this acquisition of color information is executed for each of the sales items. In addition, a bar graph having a length which represents the ratio of the actual number of items presently in stock to the appropriate number of items in stock, is colored and displayed. Therefore, the user can easily understand the stock state of each sales item. If the number of sales items of a given kind is small, the user can easily notice this state and make an additional order from a supplier. Accordingly, the inventory management of sales items can be performed with high efficiency.

According to the third embodiment, the color control file is provided independently. Due to this feature, a reference value and color information need not be defined for each sales item. Moreover, the reference value and color information can be determined with a high degree of freedom. Hence, the format in which data is displayed in colors can be arbitrarily determined.

The third embodiment was described, referring to the case where the ratio of the actual number of items to the appropriate number of items is represented as a colored bar graph. However, this in no way restricts the present invention. For example, the ratio of the actual number of items to the appropriate number of items may be processed in different colors in accordance with the ranges of the reference values defined in the color control file.

Figures 21A, 21B:
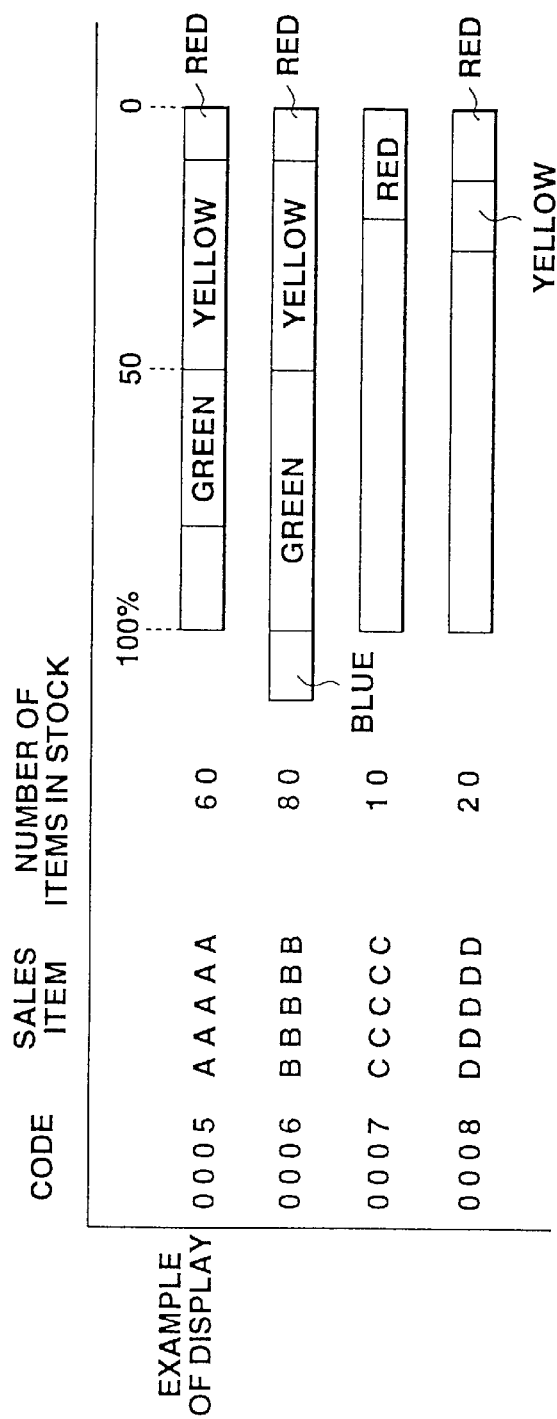
FIG. 21A shows an example of a color control file.
FIG. 21B shows an example of a manner in which a sales item list window is displayed.

This modification will be explained in a more specific way, referring to the color control file shown in FIG. 21A. In this color control file, "blue" is associated with the case where the reference value is between the appropriate number of items in stock and the number representing overstocking, "green" is associated with the case where the reference value is between 100% and 50% of the appropriate number of items in stock, "yellow" is associated with the case where the reference value is between 49% and 0% of the appropriate number of items in stock, and "red" is associated with the case where the reference value is less than the minimum number of items in stock. In this case, the bar graph of each sales item is colored and displayed in the manner shown in FIG. 21B. As shown in FIG. 21B, each bar graph has portions which are displayed in the colors defined in the color control file.

Where the bar graph for each sales item is displayed in this manner, the user can easily understand the stock of each sales item in relation to the appropriate number of items in stock. Hence, precise inventory management is enabled.

Figures 22A, 22B, 22C:
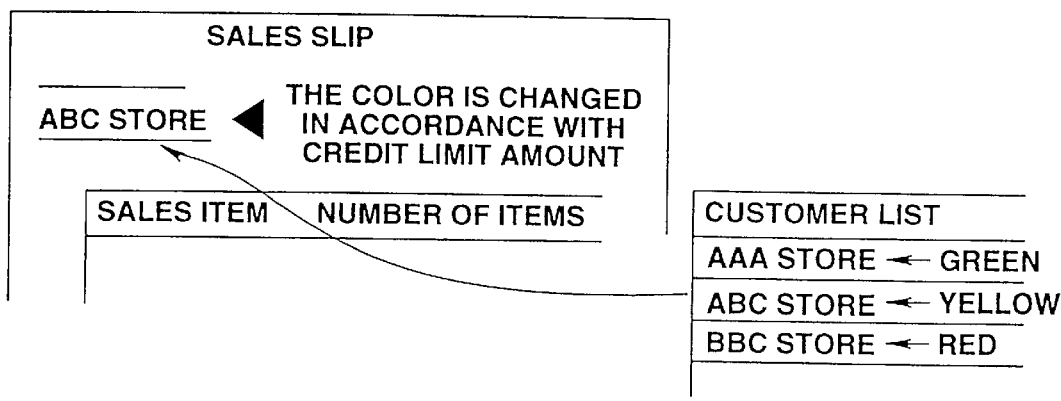
FIG. 22A shows an example of a manner in which a slip data entry window is displayed in the fourth embodiment.
FIG. 22B shows an example of a color control file.
FIG. 22C shows an example of a manner in which a customer list is displayed.
Figure 23:
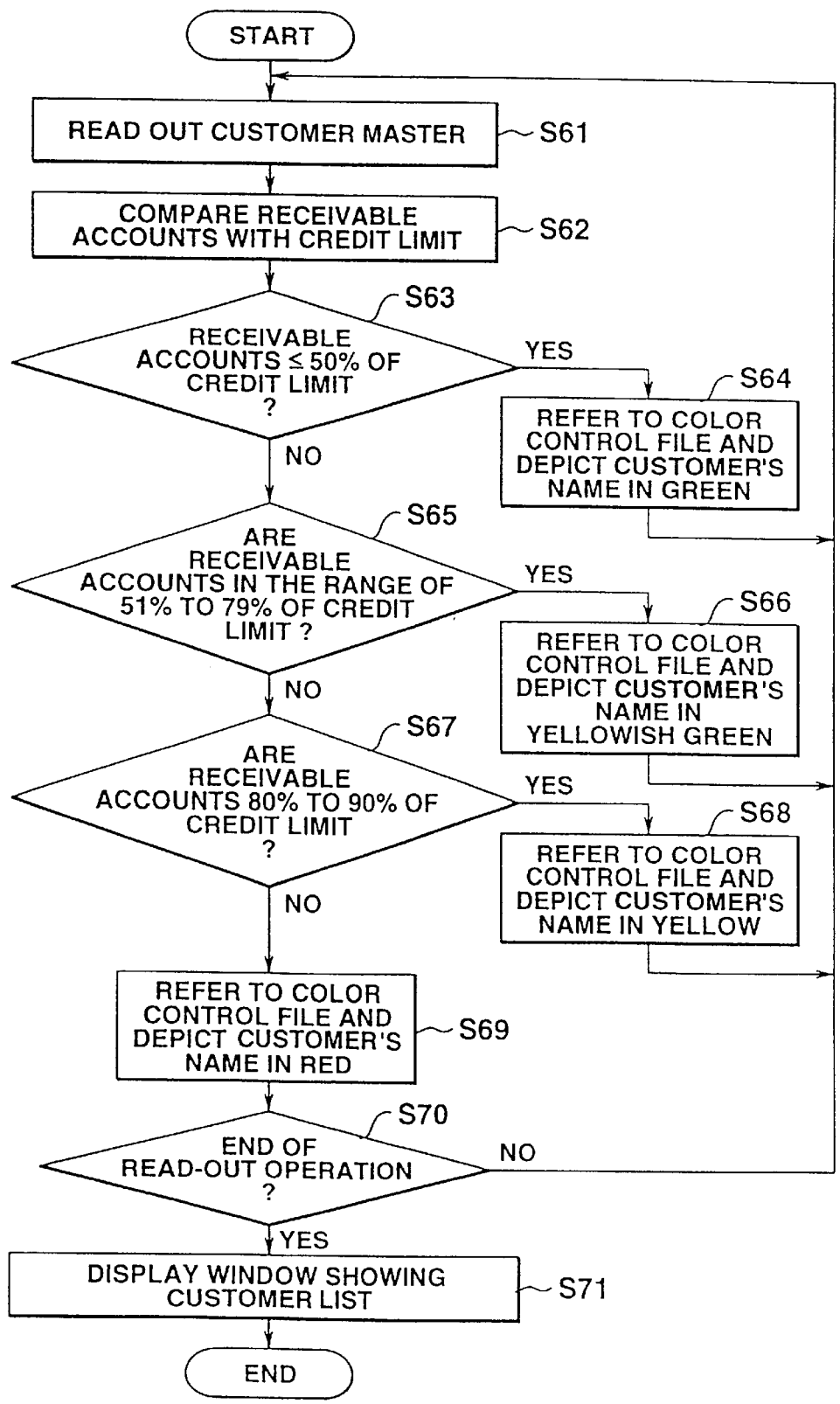
FIG. 23 is a flowchart showing credit limit displaying processing.

A description will now be given of the fourth embodiment of the present invention. FIGS. 22A through 23 show a computer system according to the fourth embodiment of the present invention.

In the second embodiment mentioned above, the sales item names described in a sales item master file are displayed in colors on the basis of the relationships defined in the sales item master file, i.e., the relationships between the number of sales items ordered or entered and the number of sales items being in stock. In the third embodiment mentioned above, the actual number of sales items which are presently in stock and the appropriate number of sales items which should be kept in stock are compared with each other by referring to the sales item list, and the ratio of the actual number to the appropriate number is displayed as a colored bar graph. In the fourth embodiment, reference will be made to a case where the credit limits of customers are displayed in colors when data is entered in a sales slip or an order acceptance slip in the management of sales and order acceptance.

Since the computer system employed in the fourth embodiment is similar to that employed in the second embodiment and shown in FIG. 11, illustration and explanation of the structure thereof will be omitted.

FIGS. 22A through 22C illustrate an example in which the credit limit of each customer displayed in color. FIG. 22A shows a case where customer "ABC Store" selected from a customer list and entered in a sales slip is displayed in the color ("yellow") defined in the customer list.

FIG. 22B show an example of a color control file which is stored in the color control file memory 40c of the RAM 40 shown in FIG. 11 and which is used for displaying the credit limit of each customer in a designated color. In the color control file shown in FIG. 22B, the ranges of credit limits are defined in portions a to d of the reference value column, and color information corresponding to the credit limit ranges are defined in the color column. In portion a, "green" is associated with the reference value "≦50% of the credit limit amount". In portion b, "yellowish green" is associated with the reference value "51% to 79% of the credit limit amount". In portion c, "yellow" is associated with the reference value "80% to 99% of the credit limit amount". In portion d, "red" is associated with the reference value "100% of the credit limit amount".

FIG. 22C show an example of a customer list displayed in accordance with the color information which are determined on the basis of the ranges of the credit limit amounts defined in the color control file. As shown in the customer list, the accounts receivable from "AAA Store" are 50,000 yen as against a credit limit amount of one million yen. Since this case applies to portion a of the color control file shown in FIG. 22B, customer "AAA Store" is displayed in green. Likewise, the accounts receivable from "ABC Store" are 850,000 yen as against a credit limit amount of one million yen. Since this case applies to portion c of the color control file shown in FIG. 22B, customer "ABC Store" is displayed in yellow. The accounts receivable from "BBC Store" are 1,100,000 yen as against a credit limit amount of one million yen. Since this case applies to portion d of the color control file shown in FIG. 22B, customer "BBC Store" is displayed in red.

The customer list mentioned above is stored in the sales item master memory 40b of the RAM 40 shown in FIG. 11 as a customer list master file.

The credit limit displaying process, which is executed by the CPU 20 to enable the credit limit of each customer to be colored and displayed, will be described with reference to the flowchart shown in FIG. 23.

First of all, an instruction for executing the credit limit displaying process is entered from the input device 30, and the customer master file to be displayed is designated. In response to this designation, the CPU 20 starts the credit limit displaying process. To be specific, the CPU 20 reads out the designated customer master file from the sales item master memory 40b of the RAM 40 and develops the readout master file in the work memory 40a of the RAM 40 (step S61). By referring to the developed master file, the CPU 20 compares the accounts receivable from a customer with the credit limit predetermined for that customer, for each sales item (step S62). On the basis of this comparison, the CPU 20 determines whether or not the accounts receivable are equal to or less than 50% of the credit limit.

If it is determined that the accounts receivable are equal to or less than 50% of the credit limit, the color control file shown in FIG. 22B is referred to. Since "green" is defined in the color column as corresponding to the reference value "≦50% of the credit limit amount", the color information on this color is acquired, and the customer's name "AAA Store" shown in FIG. 22C is colored in green (step S64). Thereafter, the flow returns to step S61.

If it is determined that the accounts receivable are not equal to or less than 50% of the credit limit, then it is determined in step S65 whether or not the accounts receivable are within the range of 51% to 79% of the credit limit amount. If they are within this range, the color control file shown in FIG. 22B is referred to. Since "yellowish green" is defined in the color column as corresponding to the reference value "51% to 79% of the credit limit amount", the color information on this color is acquired, and the customer's name "ABC Store" shown in FIG. 22C is colored in yellowish green (step S66). Thereafter, the flow returns to step S61.

If it is determined in step S65 that the accounts receivable are not within the range of 51% to 79% of the credit limit amount, it is determined in step S67 whether or not they are within the range of 80% to 99% of the credit limit amount. If they are within this range, the color control file shown in FIG. 22B is referred to. Since "yellow" is defined in the color column as corresponding to the reference value "80% to 99% of the credit limit amount", the color information on this color is acquired, and a customer's name is colored in yellow (step S68). (FIG. 22C does not show a customer's name which should be colored in yellow.) Thereafter, the flow returns to step S61.

If it is determined in step 67 that the accounts receivable do not fall within the range of 80% to 99% of the credit limit amount, this situation is considered to correspond to the reference value "=100% of the credit limit amount" defined in the color control file shown in FIG. 22B. Since, in the color column of this file, "red" is defined as corresponding to the reference value "100% of the credit limit amount", the color information on that color is acquired, and the customer's name "BBB Store" is colored in red (step S69).

Subsequently, step S70 is executed. In this step, it is determined whether all customers' names have been read out from the customer master file read out in step S61. If all customers' names have not yet been read out, the flow returns to step S61, and the operation of reading out a customer master file and the subsequent operations are repeatedly executed (steps S62 to S69). If all customers' names have been read out, step S71 is executed. In this step, a window showing a list of the customers' names including those processed in steps S64, S66, S68 and S69 is superposed on the presently displayed slip, and the processing is brought to an end.

As described above, the computer system according to the fourth embodiment is featured by its credit limit display process. In this process, color information defined in the color control file is acquired on the basis of the ratio of the receivable accounts to the credit limit amount, and this acquisition of color information is executed for each of the customers listed in the customer master file. In addition, each customer's name is displayed in the color determined in accordance with the relationship which the accounts receivable from the customer have with reference to the credit limit predetermined for that customer. Therefore, the user can easily understand the ratio of the receivable accounts to the credit limit, for each of the customers. Since the account state of each customer can be readily checked, the sales management can be performed with high efficiency.

According to the fourth embodiment, the color control file is provided independently. Due to this feature, a reference value and color information need not be defined for each sales item; they can be defined collectively. Moreover, the reference value and color information can be determined with a high degree of freedom. Hence, the format in which data is displayed in colors can be arbitrarily determined.

The fourth embodiment was described, referring to the case where the ratio of the receivable accounts to the credit limit amount is represented in color. In addition, an alarm may be sounded in response to the selection of a customer whose name is to be displayed in red due to the state of the credit limit amount.

In the second and fourth embodiments mentioned above, the characters representing the names of sales items or customers are displayed in different colors. Instead of the characters, however, the backgrounds of the cells to which the characters are assigned may be displayed in different colors.

What is claimed is:

1. A spreadsheet output apparatus for reading out from a spreadsheet memory a spreadsheet including cells having data assigned thereto and outputting the readout spreadsheet, comprising:

a plurality of color tables each of which stores evaluation conditions respectively applied to evaluations of the data of said cells, and color informations corresponding to the evaluation conditions;

a selector, including a user operable input device configured to input a selected color table name, the selector configured to select one of said plurality of color tables based on the selected color table name;

a search section configured to identify an evaluation condition for data a signed to each cell among the evaluation conditions stored in the selected color table and to detect a color information corresponding to the identified evaluation condition; and an output section configured to output the spreadsheet with said cell being colored in accordance with the corresponding color information detected by the search section.

2. A computer readable medium storing a computer program product for operating a computer to output a spreadsheet including cells having data assigned thereto, the computer program product comprising:

a data code which stores evaluation conditions respectively applied to evaluations of the data of said cells, and color informations corresponding to the evaluation conditions;

a program code which selects one of said plurality of color tables based on a selected color table name;

a program code which identifies an evalation condition for data assigned to each cell among the evaluation conditions stored in the selected color table and detects a color information corresponding to the identified evaluation condition; and a program code which outputs the spreadsheet, with the cell being colored in accordance with the corresponding detected color information.

* * * * *

UNITED STATES PATENT AND TRADEMARK OFFICE
CERTIFICATE OF CORRECTION

PATENT NO. : 6,349,315 B1  Page 1 of 1
DATED : February 19, 2002
INVENTOR(S) : Yuji Sonoyama It is certified that error appears in the above-identified patent and that said Letters Patent is hereby corrected as shown below:

<u>Title page,</u>
Item [75], Inventors, after "Yuji Sonoyama" delete to end ; and add -- , Ome, (JP) --.

Signed and Sealed this

Twenty-sixth Day of August, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,349,315 B1  
APPLICATION NO. : 08/981443  
DATED : February 19, 2002  
INVENTOR(S) : Yuji Sonoyama et al.

Page 1 of 1

It is certified that error appears in the above-identified patent and that said Letters Patent is hereby corrected as shown below:

Column 20, line 2, (claim 1, line 14);
Change "a signed" to --assigned--.

Column 20, line 18, (claim 2, line 9);
Change "said" to --a--.

Signed and Sealed this

Third Day of March, 2009

JOHN DOLL  
*Acting Director of the United States Patent and Trademark Office*